United States Patent
Yoshida et al.

(10) Patent No.: US 11,087,753 B2
(45) Date of Patent: Aug. 10, 2021

(54) DIALOG SYSTEM

(71) Applicant: KABUSHIKI KAISHA TOSHIBA, Minato-ku (JP)

(72) Inventors: Takami Yoshida, Kawasaki (JP); Kenji Iwata, Machida (JP); Hiroshi Fujimura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 232 days.

(21) Appl. No.: 16/119,674

(22) Filed: Aug. 31, 2018

(65) Prior Publication Data
US 2019/0180743 A1    Jun. 13, 2019

(30) Foreign Application Priority Data

Dec. 13, 2017   (JP) .............................. JP2017-238764

(51) Int. Cl.
| | |
|---|---|
| *G10L 15/22* | (2006.01) |
| *G10L 15/02* | (2006.01) |
| *G10L 15/06* | (2013.01) |
| *G06F 16/33* | (2019.01) |

(52) U.S. Cl.
CPC .............. *G10L 15/22* (2013.01); *G06F 16/33* (2019.01); *G10L 15/02* (2013.01); *G10L 15/063* (2013.01)

(58) Field of Classification Search
None
See application file for complete search history.

(56) References Cited

U.S. PATENT DOCUMENTS

| | | | | |
|---|---|---|---|---|
| 5,991,721 | A * | 11/1999 | Asano ..................... | G06F 40/45 704/257 |
| 9,070,366 | B1 * | 6/2015 | Mathias .................. | G10L 15/26 |
| 2003/0212546 | A1 * | 11/2003 | Shaw ..................... | G06F 40/30 704/9 |

(Continued)

FOREIGN PATENT DOCUMENTS

JP          6073498          2/2017

OTHER PUBLICATIONS

Matthew Henderson, et al., "Robust Dialog State Tracking Using Delexicalised Recurrent Neural Networks and Unsupervised Adaptation", IEEE Spoken Language Technology Workshop (SLT), 2014, 6 pages.

(Continued)

*Primary Examiner* — Thuykhanh Le
(74) *Attorney, Agent, or Firm* — Oblon, McClelland, Maier & Neustadt, L.L.P.

(57) ABSTRACT

According to one embodiment, a dialog system includes an acquirer and a processor. The acquirer acquires a first sentence. The processor refers to a first weighting amount based on a first feature and a first weight. The first feature is of a first dialog state and relates to a first slot. The first weight pertains to the first sentence. The processor refers to a second weighting amount based on a first intention amount and a second weight. The first intention amount is of a first intention and relates to the first slot. The first intention is included in the first sentence. The second weight pertains to the first sentence and is different from the first weight. The processor outputs a second feature using the first and second weighting amounts. The second feature is of a second dialog state after the first dialog state and relates to the first slot.

12 Claims, 15 Drawing Sheets

(56) References Cited

U.S. PATENT DOCUMENTS

| | | | | |
|---|---|---|---|---|
| 2006/0271364 A1* | 11/2006 | Mirkovic | ............... | G06F 40/40 704/239 |
| 2008/0071544 A1* | 3/2008 | Beaufays | ............ | H04M 3/4938 704/270.1 |
| 2010/0076843 A1* | 3/2010 | Ashton | .............. | G06Q 30/0253 705/14.51 |
| 2010/0312561 A1* | 12/2010 | Di Profio | ................ | G10L 15/22 704/256 |
| 2011/0010164 A1* | 1/2011 | Williams | .............. | G10L 15/063 704/9 |
| 2013/0185072 A1* | 7/2013 | Huang | .................... | G10L 15/01 704/246 |
| 2014/0278413 A1* | 9/2014 | Pitschel | .................. | G10L 15/22 704/243 |
| 2014/0310013 A1* | 10/2014 | Ram | ...................... | G16H 50/20 705/2 |
| 2014/0379353 A1* | 12/2014 | Boies | ...................... | G10L 17/22 704/275 |
| 2015/0134340 A1* | 5/2015 | Blaisch | ................... | G06F 16/95 704/275 |
| 2015/0149391 A1* | 5/2015 | Ziolko | ................... | G06N 3/006 706/11 |
| 2015/0340031 A1* | 11/2015 | Kim | ........................ | G10L 15/08 704/249 |
| 2016/0027439 A1* | 1/2016 | Sharifi | ..................... | G06F 3/167 704/235 |
| 2016/0034249 A1* | 2/2016 | Lee | ......................... | G06F 3/012 704/275 |
| 2016/0162477 A1* | 6/2016 | Orsini | ..................... | G06F 40/40 704/2 |
| 2016/0163314 A1* | 6/2016 | Fujii | ..................... | G10L 13/027 704/275 |
| 2016/0188565 A1* | 6/2016 | Robichaud | .......... | G06F 16/3334 704/9 |
| 2017/0148436 A1* | 5/2017 | Sugiura | ................... | G10L 15/14 |
| 2017/0148441 A1* | 5/2017 | Fujii | ...................... | G10L 15/10 |
| 2017/0162191 A1* | 6/2017 | Grost | .................... | G10L 15/075 |
| 2017/0213545 A1* | 7/2017 | Kwon | .................. | G10L 15/1815 |
| 2017/0270929 A1* | 9/2017 | Aleksic | .................. | G06F 40/295 |
| 2017/0316775 A1* | 11/2017 | Le | ............................ | G10L 15/16 |
| 2017/0372694 A1* | 12/2017 | Ushio | .................... | G06N 3/084 |
| 2018/0004729 A1* | 1/2018 | Qiu | ........................ | G06F 40/205 |
| 2018/0031385 A1* | 2/2018 | Bostick | ................ | G10L 15/1822 |
| 2018/0040317 A1* | 2/2018 | Mochizuki | .............. | G10L 15/20 |
| 2018/0046614 A1* | 2/2018 | Ushio | .................. | G06N 3/0454 |
| 2018/0075847 A1* | 3/2018 | Lee | ...................... | G06F 16/3329 |
| 2018/0090137 A1* | 3/2018 | Horling | ............... | G10L 15/1815 |
| 2018/0150739 A1* | 5/2018 | Wu | ........................ | G06N 3/006 |
| 2018/0277108 A1* | 9/2018 | Badr | ........................ | G06N 3/006 |
| 2018/0307674 A1* | 10/2018 | Akkiraju | ................ | G06N 20/00 |
| 2018/0307675 A1* | 10/2018 | Akkiraju | ................ | G06N 20/00 |
| 2019/0096395 A1* | 3/2019 | Fujii | ...................... | G10L 15/22 |
| 2019/0130904 A1* | 5/2019 | Homma | ................. | G10L 15/26 |
| 2020/0184950 A1* | 6/2020 | Iwase | ................. | G10L 15/1815 |

OTHER PUBLICATIONS

Youngsoo Jang, et al., "Neural Dialog State Tracker for Large Ontologies by Attention Mechanism", IEEE Spoken Language Technology Workshop (SLT), 2016, 7 pages.

Nikola Mrksic, et al., "Fully Statistical Neural Belief Tracking", https://arxiv.org/abs/1805.11350, May 2018, 6 pages.

N. Fukui, et al., "A MMI system using Side-Scenarios," The $2^{nd}$ collection of lecture papers of the $69^{th}$ National Convention, Artificial Intelligence and Cognitive Science, Information Processing Society of Japan (with English language translation), Mar. 6, 2007, 8 pages.

* cited by examiner

DIALOG SYSTEM

CROSS-REFERENCE TO RELATED APPLICATIONS

This application is based upon and claims the benefit of priority from Japanese Patent Application No. 2017-238764, filed on Dec. 13, 2017; the entire contents of which are incorporated herein by reference.

FIELD

Embodiments described herein relate generally to a dialog system.

BACKGROUND

As one method for providing information to a user, for example, there is a dialog system that recognizes the voice of the user and generates a response sentence. There is also a method for providing a service desired by the user from character information input by the user. The dialog system estimates the desire of the user US based on the sentence input by the user as voice or character information. The estimated desire of the user US is called the dialog state. It is desirable for the dialog system to be able to process more appropriately the history of past dialog states when estimating the current dialog state.

DETAILED DESCRIPTION

Figure 1:
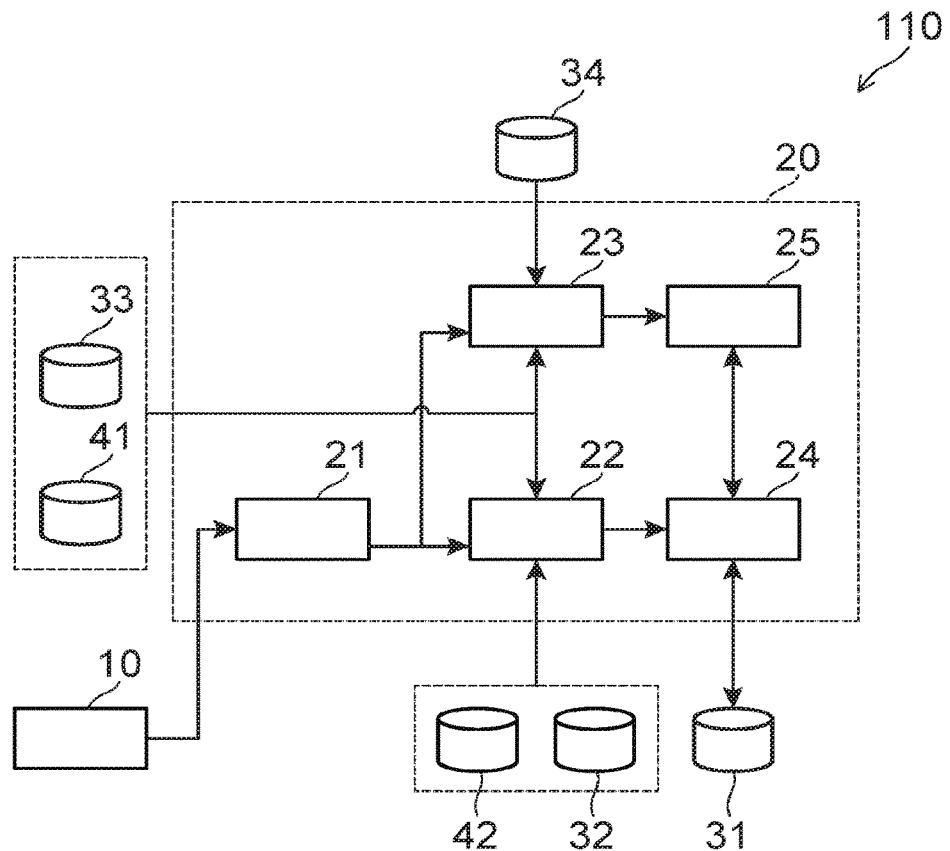
FIG. 1 is a schematic view illustrating a dialog system according to a first embodiment.

According to one embodiment, a dialog system includes an acquirer and a processor. The acquirer acquires a first sentence. The processor refers to a first weighting amount based on a first feature and a first weight. The first feature is of a first dialog state and relates to a first slot. The first weight pertains to the first sentence. The processor refers to a second weighting amount based on a first intention amount and a second weight. The first intention amount is of a first intention and relates to the first slot. The first intention is included in the first sentence. The second weight pertains to the first sentence and is different from the first weight. The processor outputs a second feature by using the first weighting amount and the second weighting amount. The second feature is of a second dialog state and relates to the first slot. The second dialog state is after the first dialog state.

Embodiments of the invention will now be described with reference to the drawings.

In the drawings and the specification of the application, components similar to those described thereinabove are marked with like reference numerals, and a detailed description is omitted as appropriate.

FIG. 1 is a schematic view illustrating a dialog system according to a first embodiment.

As shown in FIG. 1, the dialog system 110 includes an acquirer 10 and a processor 20. The acquirer 10 acquires information. The processor 20 performs processing of the information.

First, an example of the dialog system will be described.

Figure 2:
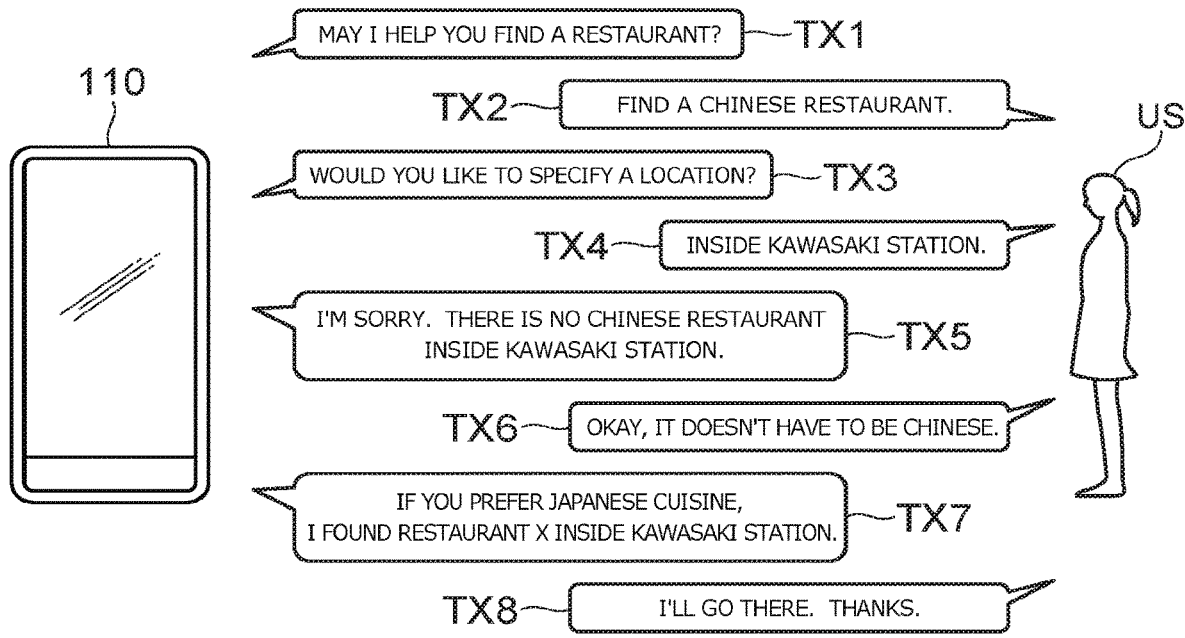
FIG. 2 is a schematic view illustrating an operation of the dialog system according to the first embodiment.

FIG. 2 is a schematic view illustrating an operation of the dialog system according to the first embodiment.

The dialog system 110 recognizes a voice emitted by the user US and generates a response sentence. The dialog system 110 estimates the intention of the user US by having a dialog with the user US by the recognition of the voice and the generation of the response sentence. For example, the dialog system 110 may estimate the intention of the user US by transferring character information to and from the user US. According to the estimated intention of the user US, the dialog system 110 provides a service (the information desired by the user US, etc.) to the user US.

For example, the dialog system 110 is used in a mobile telephone (a smartphone). For example, the user US which is the operator of the mobile telephone asks the dialog system 110 various questions by voice. The service (the information) that corresponds to the questions is provided to the user US from the dialog system 110.

FIG. 2 shows one example of the case where the user US desires food.

In a sentence TX1, the dialog system 110 asks for the desire of the user US. In response to the question, the user US says the desired cuisine type in a sentence TX2. By the transfer of the information in the sentences TX1 and TX2, the dialog system 110 understands the intention of the user US relating to the cuisine type. As in the sentences TX1 and TX2, the series of events in which one of the dialog system 110 or the user US provides information to the other of the dialog system 110 or the user US and the other of the dialog system 110 or the user US provides information to the one of the dialog system 110 or the user US is called a "turn."

For example, in a subsequent sentence TX3, the dialog system 110 asks for the desired location. In response to the question, the user US says the desired location in a sentence TX4. The dialog system 110 understands the intention of the user US relating to the location by the transfer of the information of the second turn.

The dialog system 110 searches to find information matching the intention of the user US. Specifically, the dialog system 110 searches for a Chinese restaurant inside Kawasaki Station. For example, in the case where there is no Chinese restaurant inside Kawasaki Station, the dialog system 110 informs this fact to the user US in a sentence TX5.

For example, the user US receives the information and cancels the desired cuisine type in a sentence TX6.

The dialog system 110 receives the intention and searches for a restaurant inside Kawasaki Station. For example, in the case where multiple restaurants are found, the dialog system 110 informs (proposes) the name of one restaurant to the user US in a sentence TX7. For example, the user US informs the dialog system 110 in a sentence TX8 that the proposal is accepted.

Thus, by the transfer of the information between the dialog system 110 and the user US, the dialog system 110 understands the intention of the user US and provides the service (the information) to the user US. To provide a service better matched to the intention of the user US, it is desirable for the dialog system 110 to be able to understand more appropriately the intention of the user US. To enable the appropriate intention understanding of the dialog system 110, for example, multiple "classifications" where the information can be stored are provided in the dialog system 110. For example, one of the multiple classifications is allotted to the "cuisine type." Another one of the multiple classifications is allotted to the "location."

Multiple "words" (Japanese cuisine, Chinese cuisine, Italian cuisine, etc.) are storable in one of the multiple classifications (the cuisine type). For example, in the case where the "word" of "Japanese cuisine" is stored in the classification and the user US says, "I would like Japanese cuisine," etc., the intention of the user US is estimated appropriately; and information of restaurants relating to Japanese cuisine can be provided. The intention of the user US can be estimated accurately by appropriately setting the multiple words stored in the classifications. For example, the multiple words that are stored in the classifications are provided when designing the dialog system 110. Training may be performed over time according to the results of the dialogs between the dialog system 110 and the user US.

To understand the intention of the user US more appropriately, it is favorable to add and delete words according to the increase and decrease of restaurants. For example, in the case where there had been no Chinese restaurants inside Kawasaki Station, but a new Chinese restaurant has opened, it is desirable to add a word(s) corresponding to "Chinese cuisine" to the classification of the cuisine type. For example, in the case where a Japanese restaurant that was inside Kawasaki Station has moved to another location and there is no longer a Japanese restaurant inside Kawasaki Station, it is desirable to delete the word(s) corresponding to "Japanese cuisine" from the classification of the cuisine type.

Further, it is desirable for the dialog system 110 to be able to track more accurately the intention of the user US. For example, by acquiring the sentence TX2, the dialog system 110 estimates that the user US desires a Chinese restaurant. In other words, the part of the dialog state relating to the cuisine type is "Chinese cuisine (is desired)." In the sentence TX4, the user US does not mention the desired cuisine type. However, from the dialog of the first turn, it can be seen that the user US desires Chinese cuisine. Therefore, even after acquiring the sentence TX4, it is desirable to maintain "Chinese cuisine" in the part of the dialog state relating to the cuisine type. Further, after acquiring the sentence TX4, the part of the dialog state relating to the location is "inside Kawasaki Station (is desired)."

On the other hand, in the sentence TX6, the desire that relates to the cuisine type is canceled. Therefore, after acquiring the sentence TX6, the part of the dialog state relating to the cuisine type is "None (nothing desired);" and it is desirable to maintain "inside Kawasaki Station" as part of the dialog state relating to the location.

As described above, it is desirable for the dialog system 110 to be able to process more appropriately the history of the dialog state while accommodating the increase or decrease of the words included in the classifications.

Figure 3:
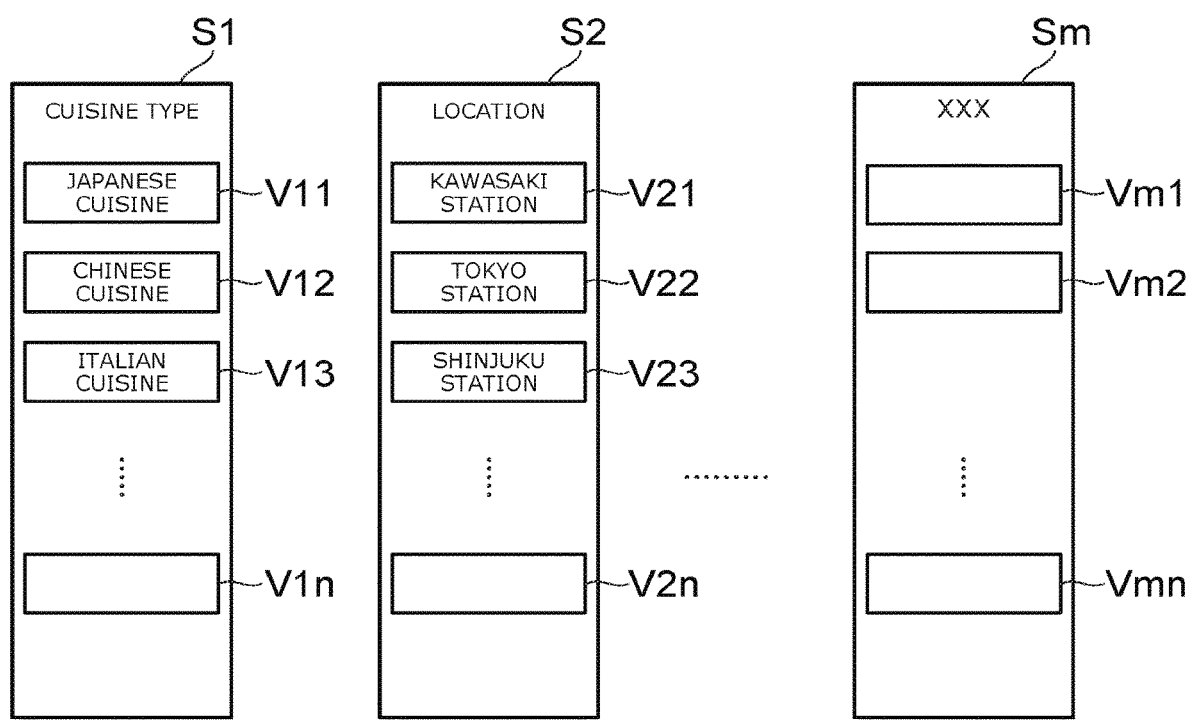
FIG. 3 is a drawing illustrating slot parameters (values) and slots.

FIG. 3 is a drawing illustrating slot parameters (values) and slots.

When estimating, the dialog system 110 refers to preset classifications and the words included in the classifications. The classifications are called slots. The words are called slot parameters or values. FIG. 3 illustrates multiple slots S1 to Sm relating to restaurants. Multiple values are set in each of the slots. For example, the slot S1 that relates to the cuisine type includes a value V11 of Japanese cuisine, a value V12 of Chinese cuisine, a value V13 of Italian cuisine, etc. The slot S2 that relates to the location includes a value V21 of Kawasaki Station, a value V22 of Tokyo Station, a value V23 of Shinjuku Station, etc. A feature is set for each of the values. The dialog system 110 refers to the multiple slots S1 to Sm, estimates the value intended by the user US, and generates the response sentence relating to the value.

Figure 4:
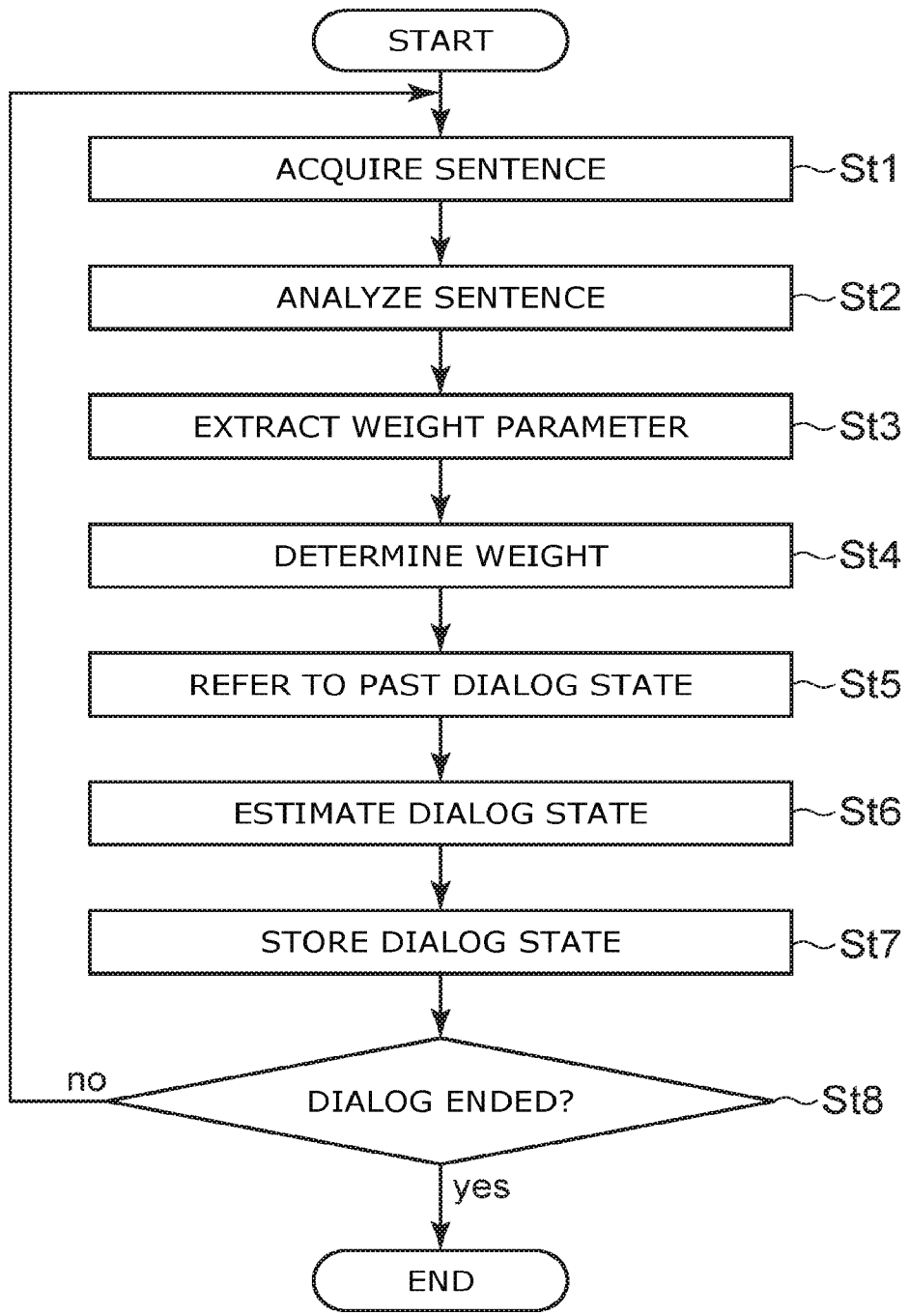
FIGS. 4 to 7 are flowcharts illustrating the operation of the dialog system according to the first embodiment.

FIG. 4 is a flowchart illustrating an operation of the dialog system according to the first embodiment.

The acquirer 10 acquires a sentence input by the user US (step St1). For example, the sentence is input by the user US. For example, the sentence is at least one of sound information (voice information) or character information. A voice may be input; and character information that is derived from the voice information may be acquired by the acquirer 10. The sentence may be based on operation information of touching a GUI (Graphical User Interface) part, etc. The acquirer 10 includes, for example, at least one of a keyboard, a microphone, or a touch panel.

The processor 20 includes, for example, a CPU (e.g., a computer, etc.). The processor 20 may include memory. The processor 20 analyzes the sentence acquired by the acquirer 10 (step St2). Thereby, the intention of the user US included in the sentence is estimated. The processor 20 analyzes the acquired sentence and extracts a weight parameter (step St3). The processor 20 determines a weight based on the extracted weight parameter (step St4). The processor 20 refers to a past dialog state (step St5).

The processor 20 estimates the current dialog state by using the intention of the user US included in the sentence, the past dialog state, and the weight (step St6). The processor 20 stores the estimated current dialog state (step St7). The processor 20 determines whether or not the dialog has ended (step St8). In the case where the dialog has not ended, the flow returns to step S1. In the case where the dialog has ended, the operation ends.

One more specific example of the dialog system 110 will now be described.

The dialog system 110 further includes, for example, a first memory part 31, a second memory part 32, a third memory part 33, a fourth memory part 34, a first model memory part 41, and a second model memory part 42.

The first memory part 31 stores dialog states estimated in the past. The first memory part 31 further stores information used to estimate the dialog state. The information includes weighting amounts, features, etc., described below.

The second memory part 32 stores the multiple slots and the multiple slot parameters included in each of the slots.

The third memory part 33 is referred to when converting a word into a vector. For example, the third memory part 33 stores a model trained using word2vec or GloVe. Or, the third memory part 33 stores correspondences between multiple words and multiple vectors. For example, a vector represented by a 1-of-K representation is allotted to each word. The number of dimensions of the vector represented by the 1-of-K representation is the same as the total number of the words stored in the third memory part 33. In the vector, only the dimension of the corresponding word is "1;" and the other dimensions all are "0."

The fourth memory part 34 stores at least one of an RNN or rules used to extract the weight parameters.

The first model memory part 41 stores a word segmentation model. The word segmentation model is referred to when segmenting a sentence into multiple words using morphological analysis. For example, the word segmentation model is represented using a model such as mecab, chasen, etc.

The second model memory part 42 stores a feature transformation model. The vectors that are based on the sentence and generated by referring to the third memory part 33 are input to the feature transformation model. A feature vector is output from the feature transformation model. The feature vector is independent of the character count of the sentence and is represented using a designated number of dimensions.

For example, the feature transformation model is a Recurrent Neural Network (RNN) that is trained beforehand. The vectors that are based on the acquired sentence are input to the input layer of the RNN. For example, at least a part of the multiple nodes included in the intermediate layer has a Long Short-Term Memory (LSTM) structure.

The slot parameters also are converted into feature vectors. When converting the slot parameters into the feature vectors, the feature transformation model that is stored in the third memory part 33 may be referred to; or another model may be referred to. Or, the slot parameters may be pre-converted into the feature vectors; and the feature vectors may be stored in the third memory part 33 or another memory part.

For example, the RNN is obtained by being generated beforehand by supervised learning. Spoken sentences provided with labels are used in the supervised learning. The labels indicate the dialog states included in the spoken sentences. In the case where the result of the similarity (distance) calculation shows that the slot parameter estimated to have a high probability is different from the correct slot parameter (the slot parameter written in the label), the parameters of the RNN are corrected to reduce the difference. The RNN is trained by repeatedly performing the correction.

The processor 20 includes, for example, an inputter 21, an analyzer 22, an extractor 23, an estimator 24, and a determiner 25.

The sentence that is acquired by the acquirer 10 is input to the inputter 21. The inputter 21 transmits the sentence to the analyzer 22 and the extractor 23. The analyzer 22 analyzes the sentence and estimates the intention of the user US included in the sentence. The extractor 23 refers to the fourth memory part 34 and extracts a weight parameter from the acquired sentence.

Specifically, the analyzer 22 refers to the third memory part 33 and the first model memory part 41 and converts the sentence input to the inputter 21 into a vector. The analyzer 22 refers to the second model memory part 42 and inputs the vector to the feature transformation model. Thereby, the analyzer 22 acquires a feature vector. The analyzer 22 further refers to the second memory part 32 and converts the slot parameters into feature vectors. The analyzer 22 calculates the similarities between the feature vector based on the sentence and the feature vectors of the slot parameters. For example, the similarities are represented using cosine distances or Euclidean distances. For example, the analyzer 22 performs normalization and generates a probability distribution so that the probability of the slot parameter having a high similarity becomes high. The analyzer 22 transmits the analysis result to the estimator 24.

The weight parameter is based on the degree of the mention of the slot in the sentence. For example, in the case where there is a mention of the slot in the sentence, the weight parameter is set to "1." In the case where there is no mention, the weight parameter is set to "0." Or, the weight parameter may be a real number not less than 0 and not more than 1 that is set according to the degree of the mention of the slot in the sentence. The extractor 23 transmits the extracted weight parameter to the determiner 25.

For example, at least one of a rule or an RNN is used in the extraction of the weight parameter.

For example, the weight parameter is extracted by a rule. In the case of the sentence "I would like to eat xxx," the weight parameter is set to 1 for the slot of the cuisine type. If there is no such sentence, the weight parameter is set to 0.

The rules are generated using wording so that the rules are independent of a designated slot parameter. Thereby, the weight parameter can be extracted appropriately even in the case where a slot parameter is added or deleted.

As an unfavorable example, a rule may be set in which the weight parameter relating to the slot of the cuisine type is set to 1 if "Japanese cuisine" is included in the sentence. In such a case, the weight parameter relating to the slot of the cuisine type cannot be set to 1 in the case where another slot parameter such as "Turkish cuisine" or the like is included in the sentence. On the other hand, if the "xxx" of the rule is Japanese cuisine or Turkish cuisine, the weight parameter can be set to 1 for a rule in which the weight parameter relating to the slot of the cuisine type is set to 1 for "I would like to eat xxx."

In the case where the weight parameter is extracted using an RNN, the input sentence is converted into a feature vector. When the feature vector is input, the RNN outputs a one-dimensional real number. For example, supervised learning of the RNN is performed beforehand. Sentences that are provided with labels indicating whether or not a slot is mentioned are used in the supervised learning.

Or, the actions up to the estimation of the dialog state may be configured as one RNN. In such a case, supervised learning that uses sentences provided with labels indicating the dialog states is performed beforehand.

The determiner 25 receives the weight parameter from the extractor 23. The determiner 25 determines a weight based on the weight parameter. In other words, the weight is a value pertaining to the sentence input to the processor 20. The weight is used to perform a weighted combination of the past dialog states and the intention of the sentence received by the estimator 24. The weight is, for example, a real number not less than 0 and not more than 1. For example, the determiner 25 may use the weight parameter as-is as the weight. In the case where the weight parameter may have a value less than 0 or exceeding 1, the weight parameter may be normalized so that the weight parameter is not less than 0 and not more than 1. The determiner 25 uses the normalized weight parameter as the weight. The determiner 25 may normalize the weight parameter using a sigmoid function.

The estimator 24 accesses the first memory part 31 and refers to the estimation results of the past dialog states stored in the first memory part 31. The determiner 25 determines the weight based on the weight parameter. The determiner 25 transmits the weight to the estimator 24. The estimator 24 performs a weighted combination of the analysis result of the sentence and the past dialog states and determines the current dialog state.

Because the dialog state is a probability distribution for the slot parameters, for example, the estimator 24 estimates the dialog state by performing a weighted sum of the past dialog states and the dialog state included in the spoken sentence.

The estimator 24 transmits the estimated dialog state to the first memory part 31. The first memory part 31 stores the transmitted dialog state. The estimator 24 outputs the estimated dialog state.

In the case where a slot parameter is added or deleted, the analyzer 22 can accommodate the addition or the deletion when calculating the similarity by adding or deleting the processing of the added or deleted slot parameter. The processing of converting the slot parameter into a vector is not affected by the increase or decrease of the slot parameter because a common model is used. The similarity is independent of the slot parameter because the similarity is based on a cosine distance or a Euclidean distance. When combining the past dialog states and the intention included in the sentence as well, the probability of the past is set to 0 for the added slot parameter. Thereby, the probability of the deleted slot parameter can be eliminated from the dialog state.

The probability of a slot parameter mentioned by the user US in the past can be stored by reducing the weight when the slot is not mentioned. In the example shown in FIG. 2, the user US desires Chinese cuisine in the speech of the first turn and desires Kawasaki Station in the speech of the second turn. At this time, when estimating the dialog state of the first turn, the similarity between the sentence based on the speech and the slot parameter "Chinese cuisine" becomes high. As a result, in the first turn, the weight of the intention relating to the cuisine type becomes large; and it can be estimated that the cuisine type of Chinese cuisine is desired. On the other hand, when estimating the dialog state of the second turn, the similarity between the sentence based on the speech and all of the slot parameters included in the cuisine type becomes low. As a result, the weight of the intention relating to the cuisine type becomes small; and the estimation result of the first turn is maintained. Thus, the dialog system 110 according to the embodiment can update the dialog state when mentioned while maintaining the past history.

Figure 5:
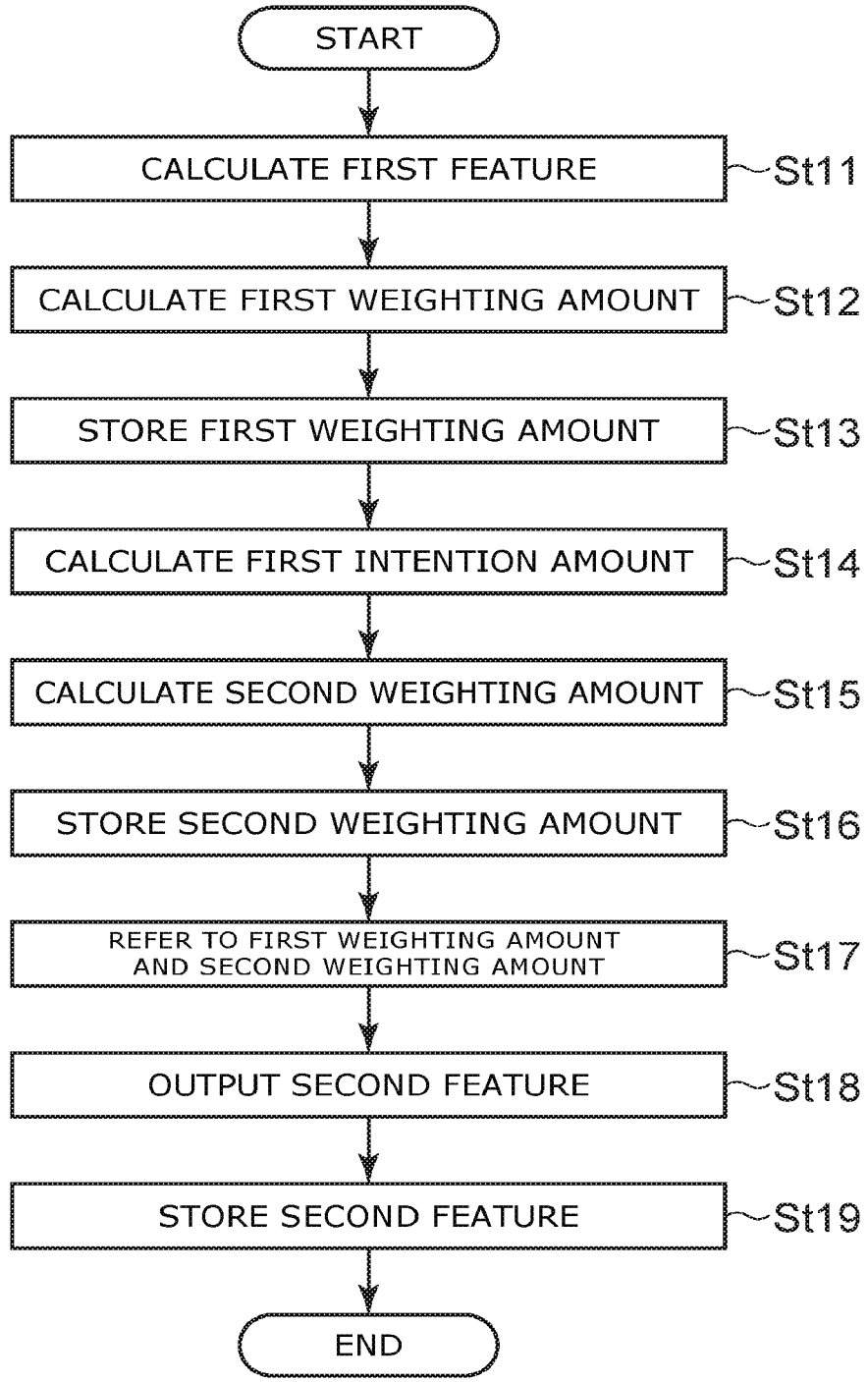

FIG. 5 is a flowchart illustrating the operation of the dialog system according to the first embodiment.

The following processing is executable according to the dialog system 110 described above.

The processor 20 calculates a first feature of a first dialog state relating to a first slot (step St11). The first slot is, for example, the cuisine type. For example, the first feature represents the desire of the user US relating to the cuisine type of the first dialog state.

The processor 20 calculates a first weighting amount based on the first feature and a first weight (step St12). The first weight pertains to a first sentence. The first weighting amount is, for example, the product of the first feature and the first weight. Or, the first weighting amount is a value based on the product of the first feature and the first weight. The processor 20 stores the first weighting amount in the first memory part 31 (step St13).

The processor 20 calculates a first intention amount (step St14). The first intention amount relates to the first slot of a first intention of the user US included in the first sentence. For example, the first intention amount represents the desire of the user US for the cuisine type of the first sentence.

The processor 20 calculates a second weighting amount based on the first intention amount and a second weight pertaining to the first sentence (step St15). For example, the second weight is different from the first weight. The second weighting amount is, for example, the product of the first intention amount and the second weight. Or, the second weighting amount is a value based on the product of the first intention amount and the second weight. The processor 20 stores the second weighting amount in the first memory part 31 (step St16).

The processor 20 accesses the first memory part 31 and refers to the first weighting amount and the second weighting amount stored in the first memory part 31 (step St17). The processor 20 outputs (calculates) a second feature by using the first weighting amount and the second weighting amount (step St18). For example, the second feature represents the desire of the user US relating to the cuisine type of a second dialog state after the first dialog state. The processor 20 stores the second feature in the first memory part 31 (step St19).

According to the dialog system 110, the second feature of the second dialog state is output based on the weighted first feature and the weighted first intention amount. Thereby, the history that relates to the first slot of the dialog state can be processed more appropriately.

In the flowchart shown in FIG. 5, the first weighting amount and the second weighting amount may be calculated by another system and stored in the first memory part 31. In such a case, steps St11 to St17 are omissible.

The dialog system 110 may execute the following processing.

Figure 6:
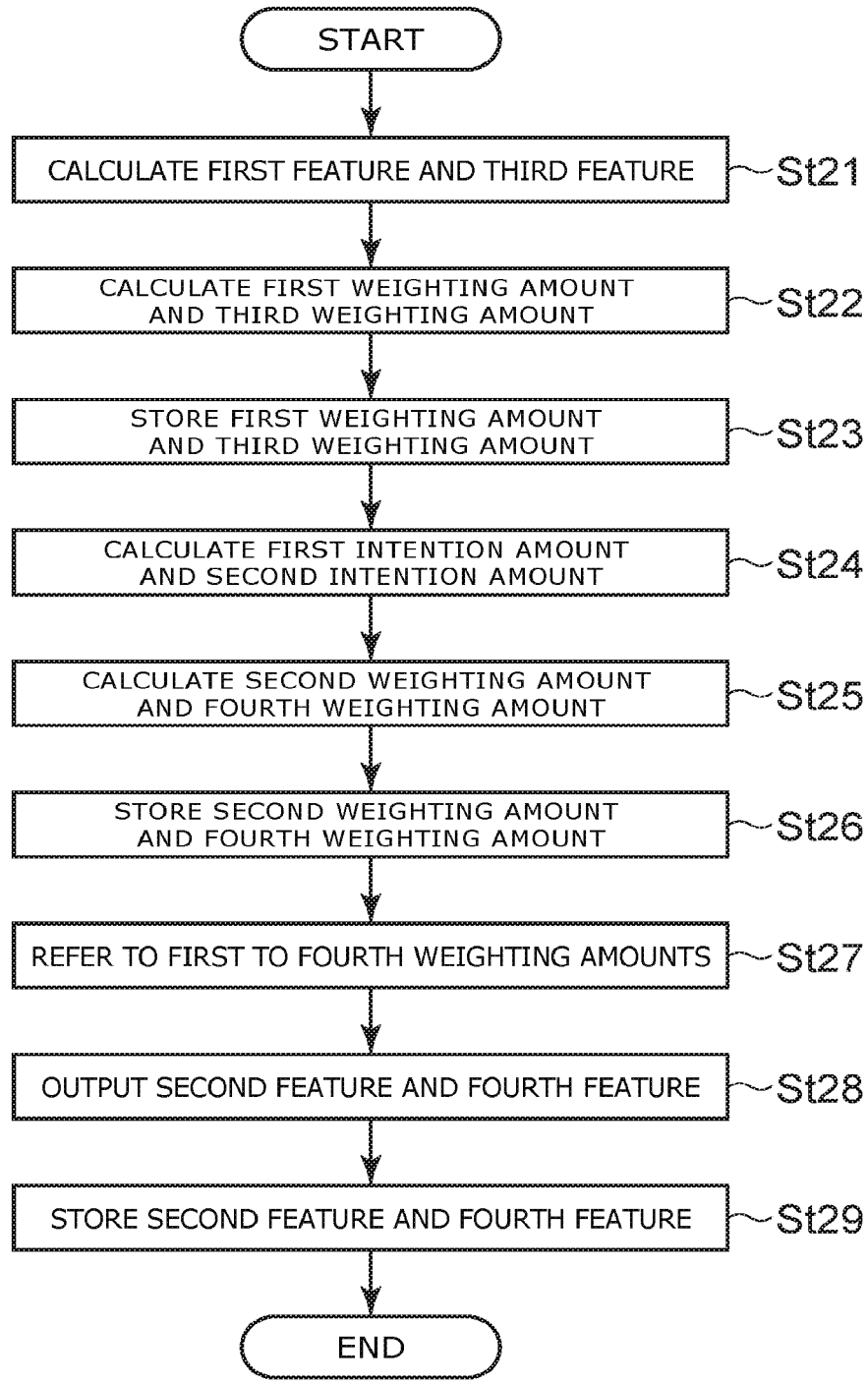

FIG. 6 is a flowchart illustrating the operation of the dialog system according to the first embodiment.

The processor 20 calculates the first feature of the first dialog state relating to the first slot and a third feature of the first dialog state relating to a second slot (step St21). For example, the second slot is the "location." The third feature represents the desire of the user US relating to the location.

The processor 20 calculates the first weighting amount and a third weighting amount (step St22). The first weighting amount is calculated based on the first feature and the first weight. The third weighting amount is calculated based on the third feature and a third weight. The first weight and the third weight pertain to the first sentence input from the acquirer 10. The third weight may be the same as the first weight or may be different from the first weight. The third weighting amount is, for example, a value based on the product of the third feature and the third weight. The processor 20 stores the first weighting amount and the third weighting amount in the first memory part 31 (step St23).

The processor 20 calculates the first intention amount and a second intention amount (step St24). The first intention amount relates to the first slot of the first intention of the user US included in the first sentence. The second intention amount relates to the second slot of the first intention. For example, the second intention amount represents the desire of the user US for the location of the first intention.

The processor 20 calculates the second weighting amount and a fourth weighting amount (step St25). The second weighting amount is calculated based on the first intention amount and the second weight pertaining to the first sentence. The fourth weighting amount is calculated based on the first sentence and a fourth weight pertaining to the second intention amount. For example, the fourth weight is different from the third weight. The fourth weighting amount is, for example, a value based on the product of the second intention amount and the fourth weight. The processor 20 stores the second weighting amount and the fourth weighting amount in the first memory part 31 (step St26).

The processor 20 accesses the first memory part 31 and refers to the first weighting amount, the second weighting amount, the third weighting amount, and the fourth weighting amount (step St27). The processor 20 outputs (calculates) the second feature and a fourth feature (step St28). The fourth feature is output using the third weighting amount and the fourth weighting amount. For example, the fourth feature represents the desire of the user US relating to the location of the second dialog state. The processor 20 stores the second feature and the fourth feature in the first memory part 31 (step St29).

According to this processing, the history relating to the first slot and the history relating to the second slot of the dialog state each can be processed more appropriately.

The dialog system 110 may further execute the following processing after the processing illustrated in the flowchart of FIG. 5.

Figure 7:
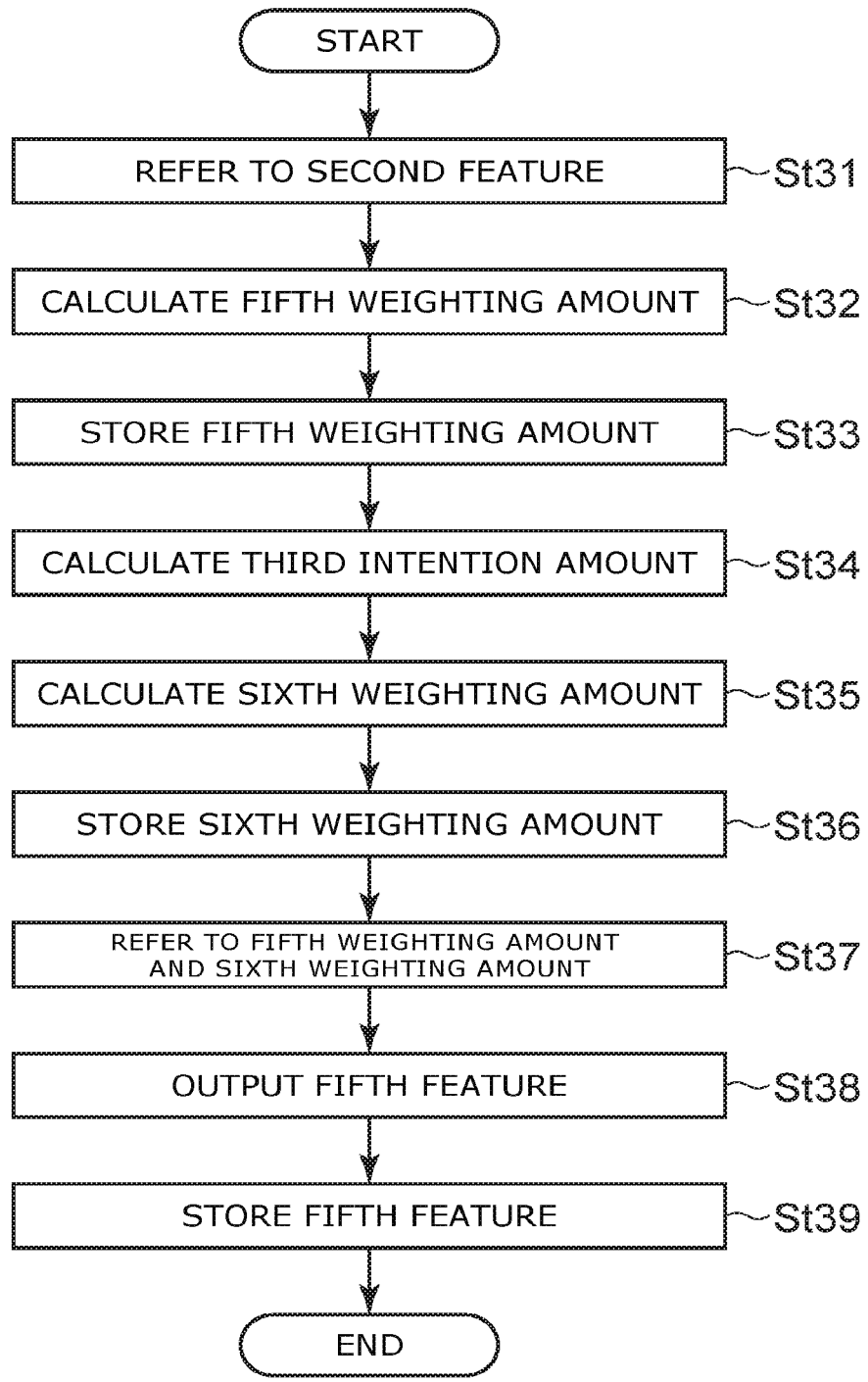

FIG. 7 is a flowchart illustrating the operation of the dialog system according to the first embodiment.

The processor 20 accesses the first memory part 31 and refers to the second feature (step St31). The processor 20 calculates a fifth weighting amount (step St32). The fifth weighting amount is calculated based on the second feature and a fifth weight. The fifth weight pertains to the second sentence acquired by the acquirer 10 after the first sentence. The fifth weighting amount is, for example, a value based on the product of the second feature and the fifth weight. The processor 20 stores the fifth weighting amount in the first memory part 31 (step St33).

The processor 20 calculates the third intention amount (step St34). The third intention amount is of the second intention of the user US included in the second sentence and relates to the first slot. For example, the third intention amount represents the desire of the user US for the cuisine type of the second sentence.

The processor 20 calculates a sixth weighting amount based on the second sentence and a sixth weight pertaining to the third intention amount (step St35). For example, the sixth weight is different from the fifth weight. The sixth weighting amount is, for example, the product of the third intention amount and the sixth weight. Or, the sixth weighting amount is a value based on the product of the third intention amount and the sixth weight. The processor 20 stores the sixth weighting amount in the first memory part 31 (step St36).

The processor 20 accesses the first memory part 31 and refers to the fifth weighting amount and the sixth weighting amount stored in the first memory part 31 (step St37). The processor 20 outputs (calculates) the fifth feature by using the fifth weighting amount and the sixth weighting amount (step St38). For example, the fifth feature represents the desire of the user US relating to the cuisine type of the third dialog state after the second dialog state. The processor 20 stores the fifth feature in the first memory part 31 (step St39).

Figure 8:
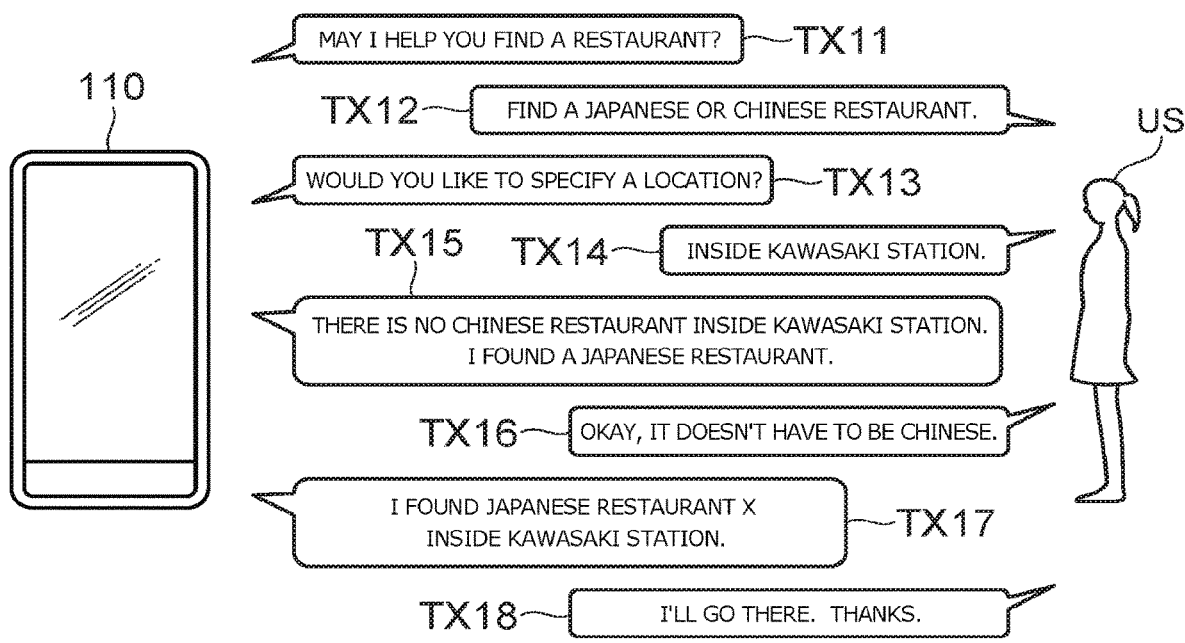
FIG. 8 is a schematic view illustrating the operation of the dialog system according to the first embodiment.

FIG. 8 is a schematic view illustrating the operation of the dialog system according to the first embodiment.

FIG. 8 shows one example of the case where the user US desires food. According to the dialog system 110 according to the first embodiment, the example shown in FIG. 8 can be processed more appropriately.

In the example shown in FIG. 8, in response to the question of a sentence TX11, the user US desires the two objects of Japanese cuisine (a first object) and Chinese cuisine (a second object) in a sentence TX12. Subsequently, in a sentence TX15, the dialog system 110 informs the user US that a Chinese restaurant was not found, but a Japanese restaurant was found. In response to the sentence TX15, the user US negates Chinese cuisine in a sentence TX16.

The sentence TX16 includes only the intention of the negation of Chinese cuisine. However, it is apparent from the dialog before the sentence TX16 that the user US desires Japanese cuisine. According to the dialog system 110 according to the first embodiment, the user US can be informed in a sentence TX17 that a Japanese restaurant has been found.

Specifically, when acquiring the sentence TX12 in the dialog system 110, a first priority of a first slot parameter corresponding to Japanese cuisine and a second priority of a second slot parameter corresponding to Chinese cuisine become high compared to the previous states. At this time, for example, the first priority and the second priority are higher than a third priority of a third slot parameter corresponding to Italian cuisine. For example, the first priority, the second priority, and the third priority each are represented as probabilities. An increase of the first priority and an increase of the second priority correspond respectively to increases of the probability of desiring the first slot parameter and the probability of desiring the second slot parameter.

On the other hand, when acquiring the sentence TX16, the second priority decreases; and the first priority becomes higher than the second priority. This is because the weight parameter is extracted from the sentence TX16, and the weight is determined based on the weight parameter.

For example, there is no mention of the slot parameter of the cuisine type in a sentence TX14. Accordingly, the similarities between the vector corresponding to the sentence TX14 and the vectors of the slot parameters included in the cuisine type are small. The slot parameter of Chinese cuisine of the cuisine type is negated in the sentence TX16. Accordingly, the similarity between the vector corresponding to the sentence TX16 and the vector of the slot parameter of Chinese cuisine increases. However, the similarity is low in the sentence TX16 because Chinese cuisine is negated. For example, by changing the weight parameter according to the case where there is no mention or the case of a negation, the second priority can be greatly reduced when acquiring the sentence TX16 without reducing the second priority when acquiring the sentence TX14. As a result, the dialog system 110 can appropriately estimate that the user US desires Japanese cuisine.

In the example described above, the first memory part 31 stores the dialog state of one turn previous. The first memory part 31 may store dialog states further in the past. For example, the first memory part 31 stores first to Nth histories (N being a real number of 2 or more) of the dialog state. The Mth history (M being a real number not less than 1 and not more than N) is the history of the dialog state of M turns previous. The estimator 24 accesses the first memory part 31 and refers to at least one of the first to Nth histories.

The determiner 25 determines the weights based on the intention included in the input sentence and the history of the dialog state. For example, in the case where the first to Nth histories are transmitted from the first memory part 31 to the estimator 24, the determiner 25 determines the weights of the intention included in the sentence and the first to Nth histories.

The estimator 24 receives the analysis result of the sentence from the analyzer 22. The estimator 24 receives the multiple weights from the determiner 25. The estimator 24 estimates the dialog state based on the analysis result of the sentence from the analyzer 22, the multiple weights, and the dialog state from one turn previous to N turns previous.

Figure 9:
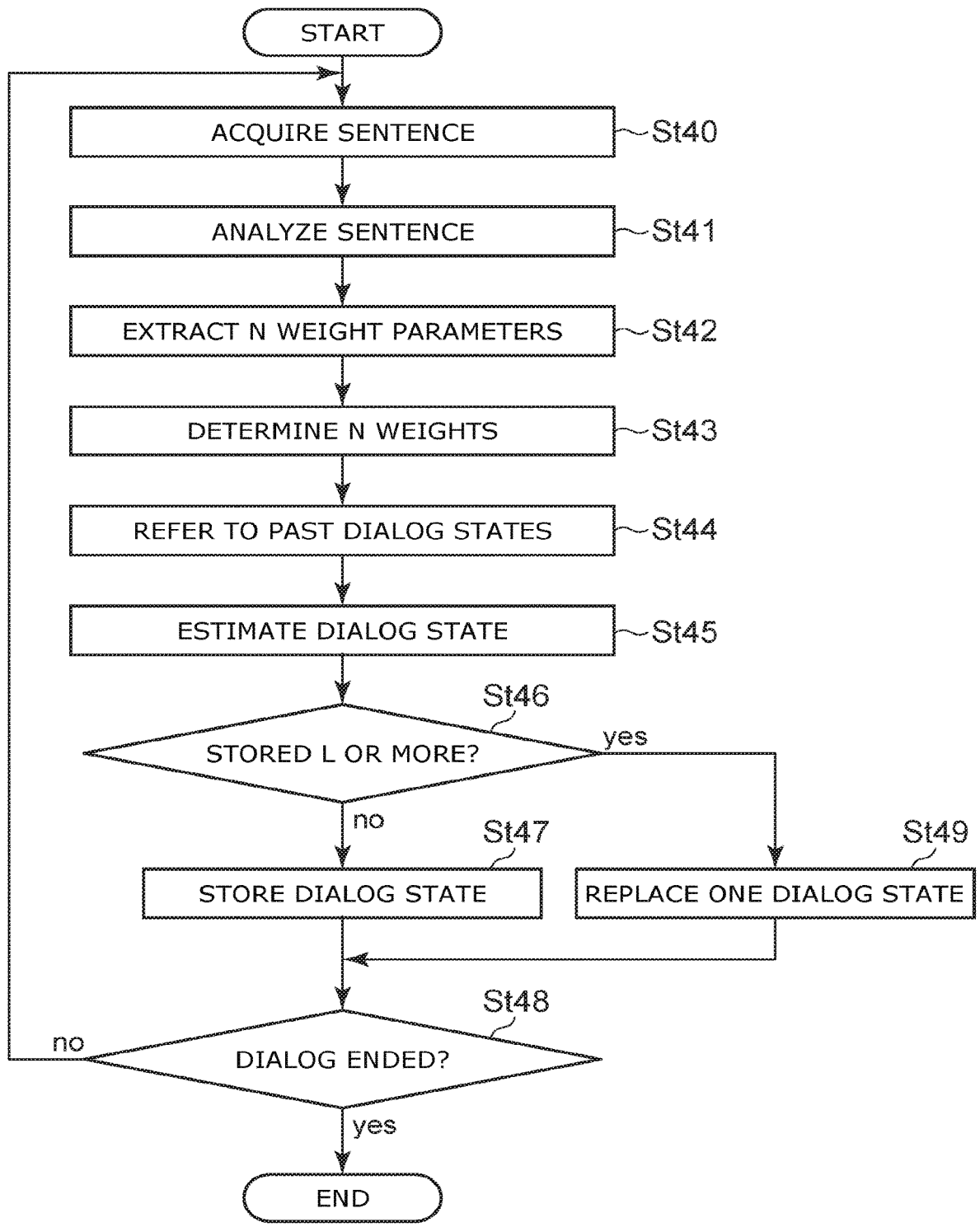
FIG. 9 is a flowchart illustrating another operation of the dialog system according to the first embodiment.

FIG. 9 is a flowchart illustrating another operation of the dialog system according to the first embodiment.

Step St40 and St41 are executed similarly to steps St1 and St2 of the flowchart shown in FIG. 4. The extractor 23 extracts the multiple weight parameters from the input sentence (step St42). The multiple weight parameters respectively represent how much attention should be given to the multiple dialog states of the past. For example, N weight parameters are extracted in the case where the first to Nth histories are used in the estimation of the dialog state by the estimator 24. For example, the multiple weight parameters each are represented using "1" or "0." For example, "1" represents that the history should be given attention; and "0" represents that the history should not be given attention. The multiple weight parameters each may be a real number not less than 0 and not more than 1 representing the degree of attention to be given. Or, the multiple weight parameters each may be a vector representing the degree of attention to be given.

For example, an attention mechanism which is one type of neural network is used in the specific extraction of the weight parameter. The N weight parameters are output by inputting the first to Nth histories and the sentence represented as a series of word vectors to the RNN. In such a case, the multiple weight parameters each may be a real number or a multi-dimensional vector.

The RNN is trained beforehand by using teaching data provided with correct labels for the speech of the previous turns that should be given attention. In the case where the weights to be extracted are different from the correct labels, the parameters of the RNN are trained to reduce the difference. Or, the RNN can be trained using teaching data provided with correct labels of the dialog states.

The determiner 25 determines N weights based on N weight parameters (step St43). The N weights may be determined to be the N weight parameters as-is. The N weight parameters may be converted into the N weights by using a neural network. The N weights may be determined by normalizing the N weight parameters.

The determiner 25 refers to the first memory part 31 and refers to multiple past dialog states (step St44). The determiner 25 estimates the current dialog state using the intention of the user US included in the sentence, the multiple past dialog states, and the multiple weights (step St45). The determiner 25 determines whether there are L or more past dialog states stored in the first memory part 31 (step St46). In the case where less than L dialog states are stored, the determiner 25 stores the latest dialog state in the first memory part 31 (step St47); and the flow proceeds to step St48. In the case where there are L or more stored dialog states, the first memory part 31 overwrites the oldest dialog state of the L stored dialog states with the latest dialog state (step St49). Step St48 is performed similarly to step St8 of the flowchart shown in FIG. 4.

According to this method, the history of the dialog state can be processed more appropriately. For example, even in the case where the topic changes and then returns to a previous topic, the dialog state can be estimated with higher accuracy.

Figure 10:
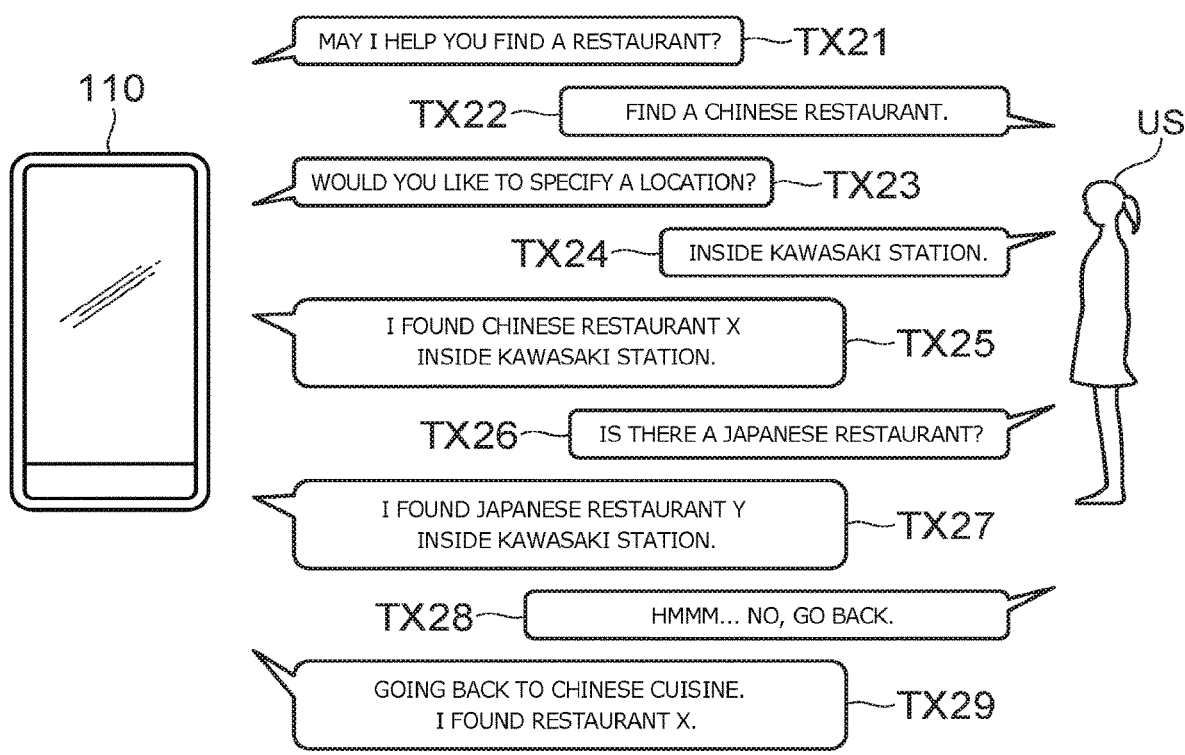
FIG. 10 is a schematic view illustrating the operation of the dialog system according to the first embodiment.

FIG. 10 is a schematic view illustrating the operation of the dialog system according to the first embodiment.

In the example shown in FIG. 10, the topic (the desire of the user US) is changed in a sentence TX28 of the fourth turn and returns to a previous topic. Namely, in the sentence TX28, the user US returns the topic to the Chinese cuisine mentioned in a sentence TX22 of the first turn.

For example, in the case where the dialog system 110 is used, the probability of Japanese cuisine is set to 1 for the cuisine type of the dialog state as a result of inputting a sentence TX26 of the third turn. On the other hand, in the sentence TX28, there is no mention relating to the cuisine type. As a result, it is not easy to estimate that the user US is desiring Chinese cuisine based on the sentence TX28 and the dialog state when the sentence TX26 was input.

According to the method described above, the current dialog state is estimated using the history of at least two previous turns. For example, based on the sentence TX28, the extractor 23 extracts a weight parameter that should not give attention to the dialog state of one turn previous but to a dialog state further in the past. When performing the estimation of the fourth turn, the weight pertaining to the first turn is large; and the weight pertaining to the third turn is small. In other words, for the cuisine type of the dialog state, the probability of Japanese cuisine can be reduced; and the probability of Chinese cuisine can be increased.

According to the dialog system 110, the following processing also is executable after the processing illustrated in the flowchart of FIG. 5.

Figure 11:
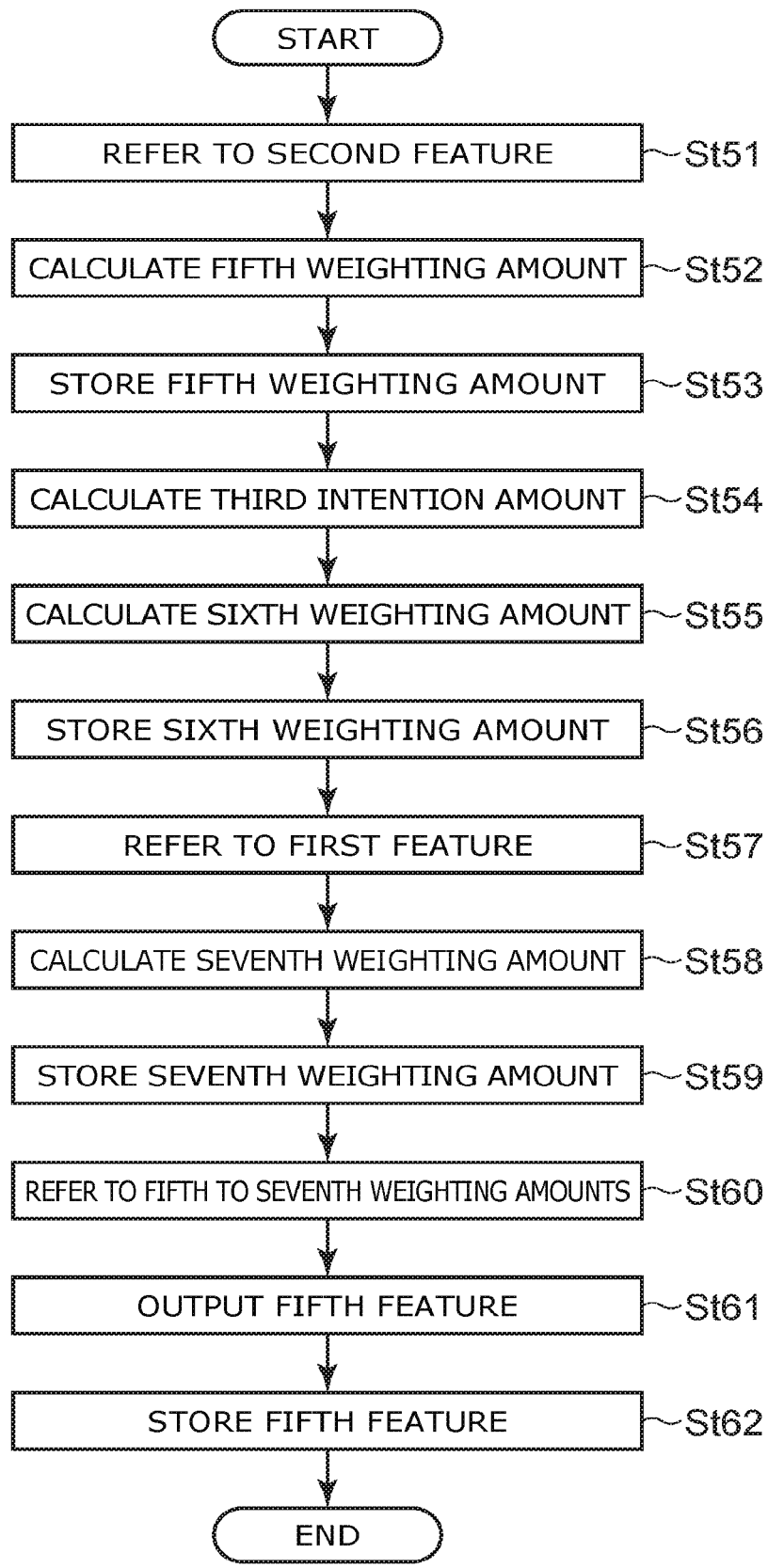
FIG. 11 is a flowchart illustrating the operation of the dialog system according to the first embodiment.

FIG. 11 is a flowchart illustrating the operation of the dialog system according to the first embodiment.

Steps St51 to St56 respectively are executed similarly to steps St31 to St36 of the flowchart shown in FIG. 7. The processor 20 accesses the first memory part 31 and refers to the first feature (step St57). The processor 20 calculates a seventh weighting amount (step St58). The seventh weighting amount is calculated based on the first feature and a seventh weight. The seventh weight pertains to the second sentence. For example, the seventh weight is different from the fifth weight and the sixth weight. The seventh weighting amount is, for example, a value based on the product of the first feature and the seventh weight. The processor 20 stores the seventh weighting amount in the first memory part 31 (step St59).

The processor 20 accesses the first memory part 31 and refers to the fifth weighting amount, the sixth weighting amount, and the seventh weighting amount stored in the first memory part 31 (step St60). The processor 20 outputs (calculates) the fifth feature by using the fifth weighting amount, the sixth weighting amount, and the seventh weighting amount (step St61). The processor 20 stores the fifth feature in the first memory part 31 (step St62).

According to the dialog system 110, the fifth feature of the second dialog state is output based on the weighted second feature, the weighted third intention amount, and the weighted first feature. Thereby, the history relating to the first slot of the dialog state can be processed more appropriately.

Figure 12:
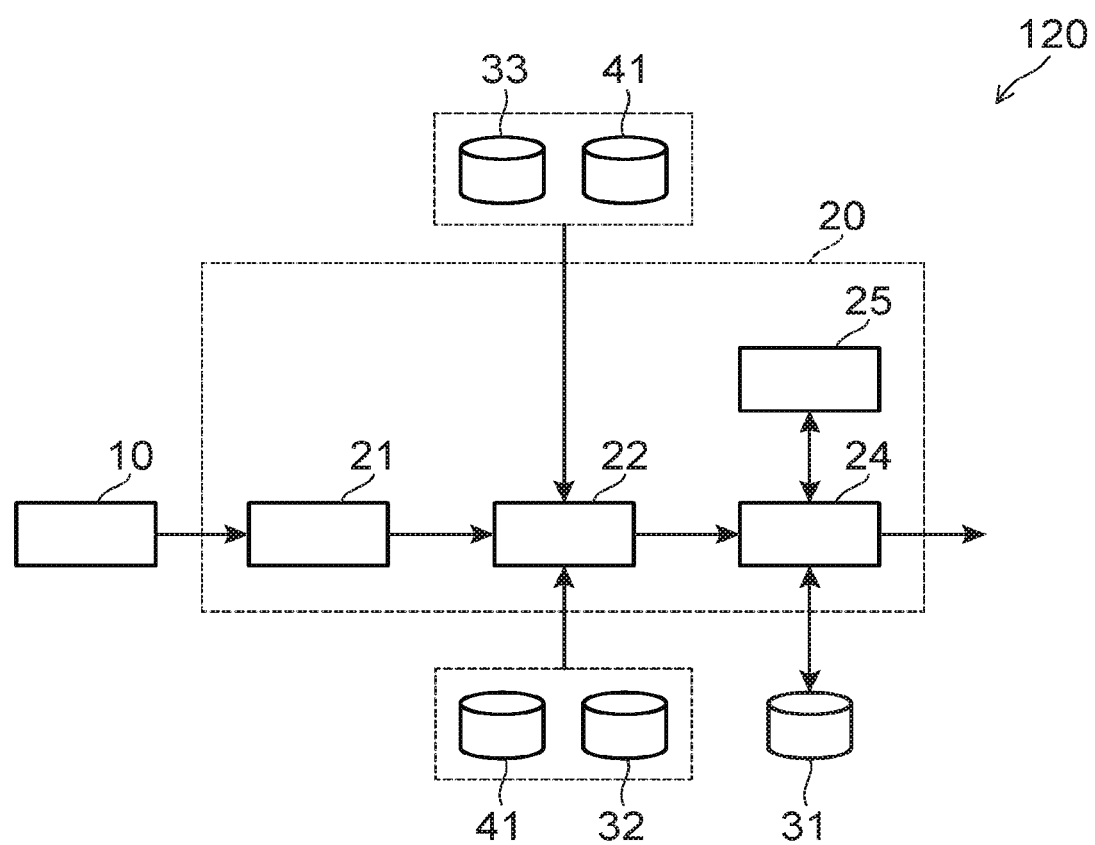
FIG. 12 is a schematic view illustrating a dialog system according to a modification of the first embodiment.

FIG. 12 is a schematic view illustrating a dialog system according to a modification of the first embodiment.

The dialog system 120 shown in FIG. 12 does not include the extractor 23. In such a case, for example, the weight is determined based on the existence or absence of the mention of the slot in the acquired sentence or the degree of the mention.

For example, when determining the weight, the determiner 25 refers to a rule generated by a human. Or, a model that estimates the weight may be pre-generated. When determining the weight, the determiner 25 refers to this model. The weight may be determined based on the dialog states included in the spoken sentence received by the estimator 24 from the analyzer 22. For example, the weight may be determined based on the dialog state included in the spoken sentence having the highest probability. Also, the weight may be determined based on the total and/or the average value of the probabilities of all of the slot parameters for the dialog states included in the spoken sentence. The weight may be determined from the dialog states included in the spoken sentence by using a neural network. The network receives the probabilities of the slot parameters as the input, and outputs the weight. The network is generated beforehand by supervised learning using spoken sentences provided with labels indicating the dialog states included in the spoken sentences.

Figure 13:
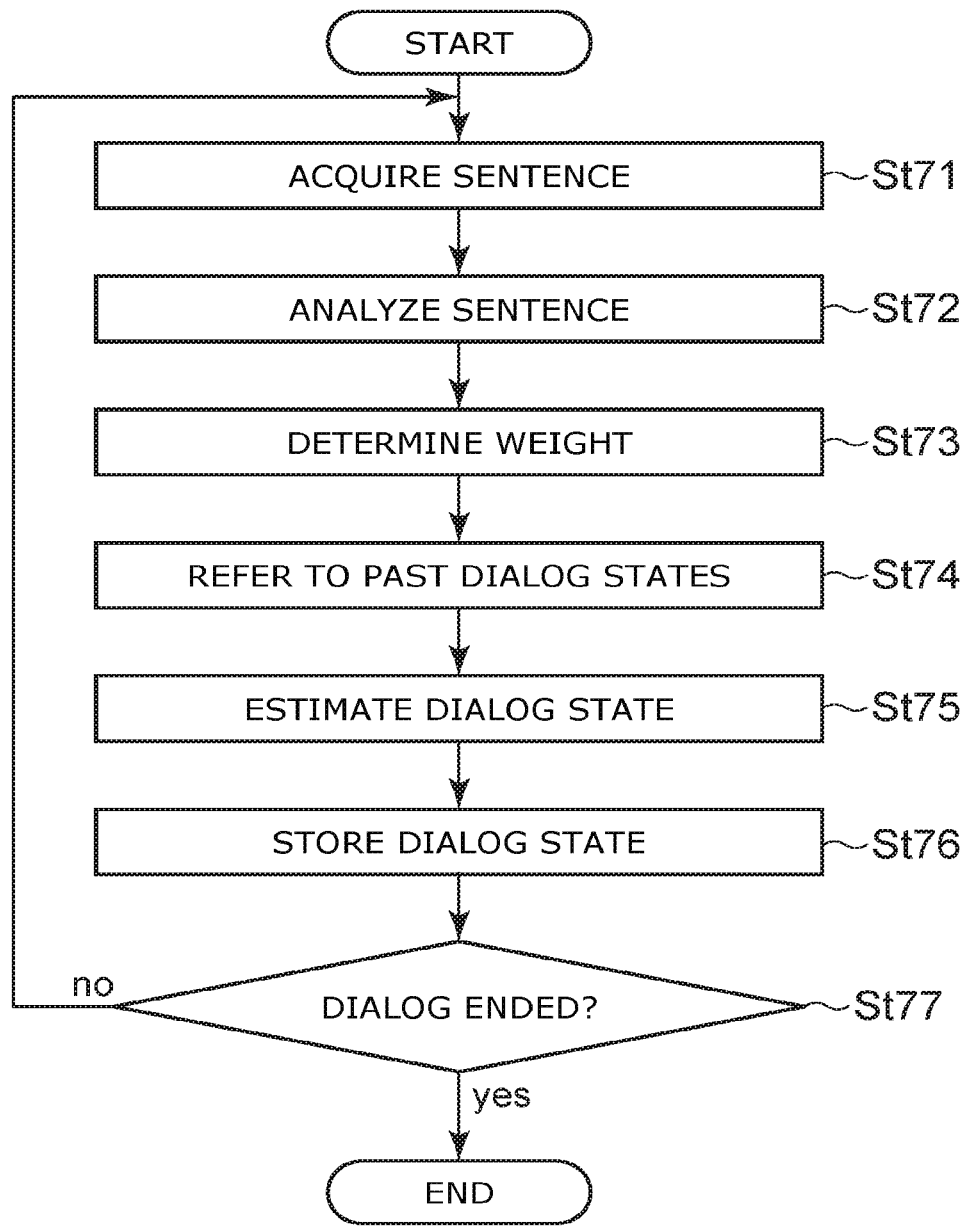
FIG. 13 is a flowchart illustrating a dialog system according to a modification of the first embodiment.

FIG. 13 is a flowchart illustrating a dialog system according to a modification of the first embodiment.

The acquirer 10 acquires the sentence input by the user (step St71). The processor 20 analyzes the sentence acquired by the acquirer 10 (step St72). Thereby, the intention of the user included in the sentence is estimated. The processor 20 determines the weight based on the sentence (step St73). Further, the processor 20 refers to the past dialog states (step St74).

The processor 20 estimates the current dialog state by using the intention of the user included in the sentence, the past dialog states, and the weight (step St75). The processor 20 stores the estimated current dialog state (step St76). The processor 20 determines whether or not the dialog has ended (step St77). In the case where the dialog has not ended, the flow returns to step S71. In the case where the dialog has ended, the operation ends.

Figure 14:
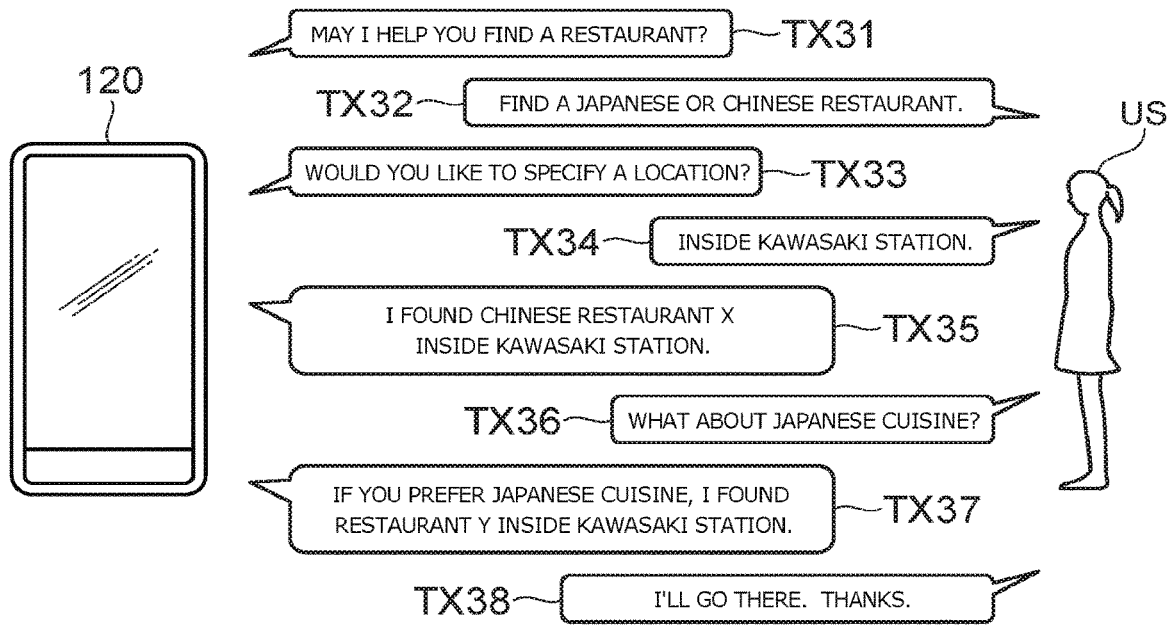
FIG. 14 is a schematic view illustrating the operation of a dialog system according to a modification of the first embodiment.

FIG. 14 is a schematic view illustrating the operation of a dialog system according to a modification of the first embodiment.

In the example shown in FIG. 14, for example, the probability of Chinese cuisine for the cuisine type is set to 1 by the dialogs of the first turn and the second turn including sentences TX31 to TX34. The probability of Kawasaki Station is set to 1 for the location. Subsequently, the user US desires Japanese cuisine in a sentence TX35. More specifically, the sentence TX35 includes the intention of the user US desiring not Chinese cuisine but Japanese cuisine. According to the dialog system 120, based on the acquisition of the sentence TX35, the probability of Japanese cuisine can be set to be higher than the probability of Chinese cuisine. As a result, the dialog system 120 searches for a Japanese restaurant inside Kawasaki Station and informs the search result to the user US in a sentence TX36.

As in the example shown in FIG. 14, when acquiring the first sentence desiring the first object, the dialog system 120 sets the first priority of the first slot parameter corresponding to the first object to be higher than the second priority of the second slot parameter corresponding to the second object. Then, when acquiring the second sentence desiring the second object after acquiring the first sentence, the dialog system 120 sets the second priority to be higher than the first priority.

The processing of the dialog system 120 described above is possible by determining the weights respectively for the dialog state based on the first sentence and for the intention included in the second sentence. In the case where the weights are not used, for example, the probabilities of Japanese cuisine and Chinese cuisine each are set to 0.5 for the dialog state based on the sentence TX36. By using the weights, the priority (the probability) of Japanese cuisine can be higher than the priority of Chinese cuisine. Accordingly, according to the dialog system 120, similarly to the dialog system 110, the history of the dialog state can be processed more appropriately.

Figure 15:
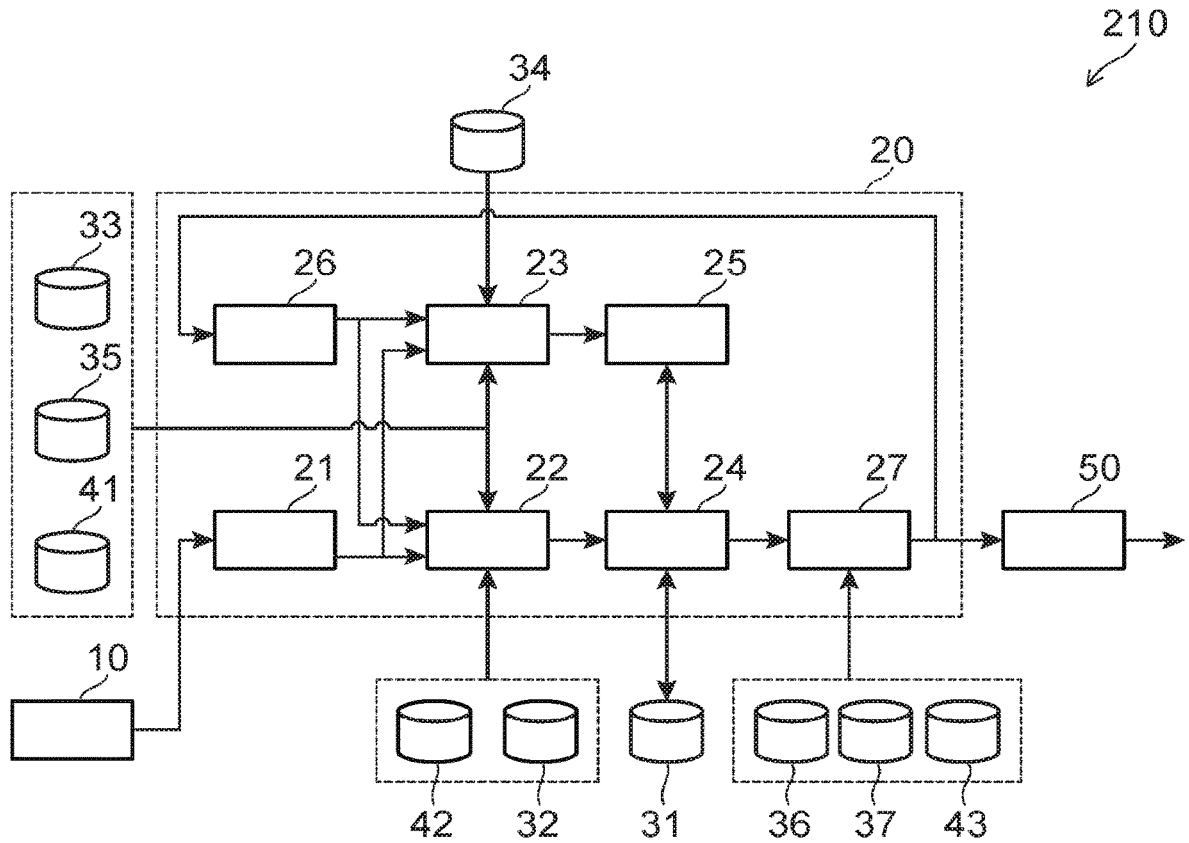
FIG. 15 is a schematic view illustrating a dialog system according to the second embodiment.

FIG. 15 is a schematic view illustrating a dialog system 210 according to the second embodiment.

The dialog system 210 performs the processing using not only the sentence input by the user but also the information (the question) provided by the dialog system 210 directly before.

The dialog system 210 further includes, for example, a fifth memory part 35, a sixth memory part 36, a seventh memory part 37, a third model memory part 43, and an outputter 50. The processor 20 further includes a system response acquirer 26 and a dialog controller 27.

The fifth memory part 35 stores a system response vector dictionary. The dictionary is referred to when the dialog system 110 converts the output question into a vector. For example, the system response vector dictionary stores a correspondence between abstract multiple tags and multiple numerical values, a correspondence between multiple slots and multiple numerical values, and a correspondence between multiple slot parameters and multiple numerical values.

A tag abstractly represents the intention of the sentence. For example, the multiple tags include tags such as "question," "confirmation," etc. In the case where the sentence relates to a question, the tag of "question" is provided. In the case where the sentence relates to a confirmation, the tag of "confirmation" is provided.

A corresponding numerical value is allotted to each tag. For example, 1 is allotted to the tag of "question." 2 is allotted to the tag of "confirmation." Similarly, corresponding numerical values are allotted to the slots and the slot parameters. For example, 1 is allotted to the slot of "cuisine type." 2 is allotted to the slot of "location." 1 is allotted to the slot parameter of "Japanese cuisine." 2 is allotted to the slot parameter of "Chinese cuisine."

The sixth memory part 36 stores dialog content. The dialog content includes content introduced in the output of the dialog system 210. The content is, for example, the cuisine type, the name of a shop, a location, a price range, etc.

The seventh memory part 37 stores scenarios. The scenarios are based on the estimated dialog state and are used to determine the system response. For example, the scenarios are represented using rules. For example, one of the rules is "output question (location) in the case where the probability of Japanese cuisine is 0.9 or more." Another one of the rules is "output a confirmation of whether the cuisine type is Japanese cuisine in the case where the probability of Japanese cuisine is not less than 0.2 and not more than 0.9."

The scenario may be represented using a model that is trained beforehand. For example, such a model selects the system response based on the probabilities of the slot parameters.

The third model memory part 43 stores a response generation model. The response generation model is used to generate the system response based on the abstract tags, the slots, and the slot parameters. For example, the response generation model stores a template including blanks. For example, an abstract tag is "question (xxx);" and a template is "Any preference for xxx?." In another example, the abstract tag is "confirmation (xxx=yyy);" and the template is "Is yyy correct for xxx?."

The system response acquirer 26 receives the system response to reflect the directly-previous system response in the dialog state estimation. The system response is the sentence output to the user from the dialog system 210. The system response acquirer 26 receives the system response from the dialog controller 27. The system response acquirer 26 transmits the received system response to the analyzer 22.

The analyzer 22 receives the sentence from the inputter 21. The analyzer 22 receives the system response from the system response acquirer 26. The analyzer 22 estimates the intention of the user included in the sentence from the system response and the sentence input by the user. The analyzer 22 transmits the estimated intention (the analysis result of the sentence) to the estimator 24. The extractor 23 extracts the weight parameter from the system response and the sentence input by the user. The extractor 23 transmits the extracted weight parameter to the determiner 25.

The determiner 25 determines the weight based on the weight parameter and the past dialog states and transmits the weight to the estimator 24. The estimator 24 performs a weighted combination of the analysis result of the sentence and the past dialog states and determines the current dialog state. The estimator 24 transmits the estimated dialog state to the dialog controller 27. The dialog controller 27 transmits the sentence (the system response) based on the estimated dialog state to the system response acquirer 26 and the outputter 50.

The outputter 50 receives the system response and outputs the system response. For example, the outputter 50 is a monitor. In such a case, the outputter 50 displays the system response. The outputter 50 may be a speaker; and the system response may be output as a voice. The outputter 50 may be a printer; and the system response may be displayed by printing.

For example, the system response is represented using at least one of text, a voice signal, or an abstracted tag. For example, the query of "Any preference for the cuisine type?" is represented using the abstracted tag of "question (cuisine type)." The query of "Is Japanese cuisine okay as the desired cuisine type?" is represented using the abstracted tag of "confirmation (cuisine type=Japanese cuisine)." The query of "How about restaurant A?" is represented using the abstracted tag of "proposal (name=restaurant A)." The answer of "the location is Kawasaki and the telephone number is 1234-5678" is represented using the abstracted tag of "response (location=Kawasaki, telephone number=1234-5678)." Thus, the tag is represented using the set of a slot and a slot parameter.

The degree of attention to be given to the sentence input by the user is not necessarily the same as the degree of attention to be given to the system response. For example, the system response asks the question, "Shall I inquire regarding procedure A?." In response to the question, the user answers "Yes." In such a case, the slot parameter corresponding to the procedure A should be given attention. The importance of the sentence for estimating the dialog state is low. The dialog state can be estimated appropriately by giving attention to the system response.

Figure 16:
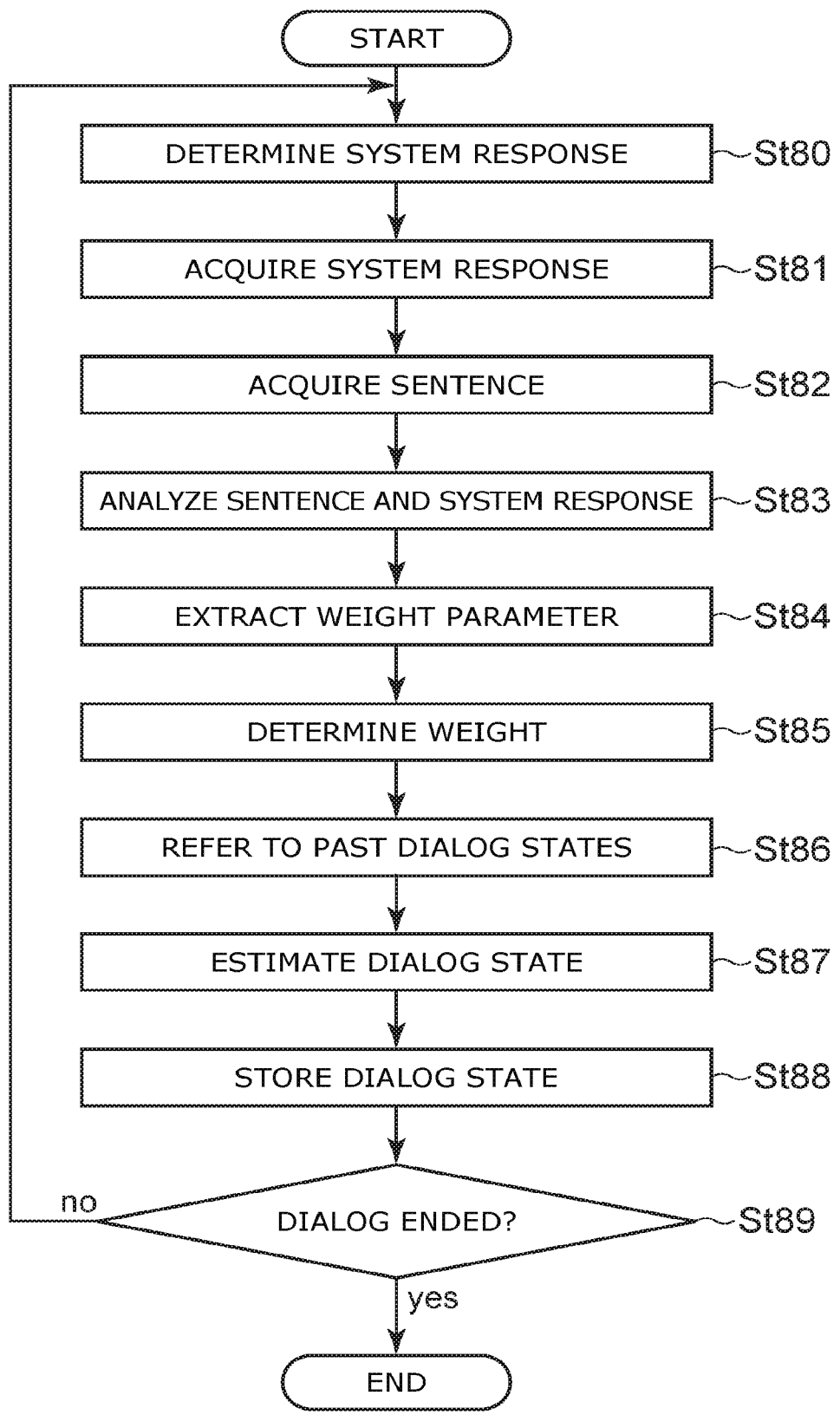
FIG. 16 is a flowchart illustrating the operation of the dialog system according to the second embodiment.

FIG. 16 is a flowchart illustrating the operation of the dialog system according to the second embodiment.

The dialog controller 27 determines the system response (step St80) and transmits the system response to the system response acquirer 26 and the outputter 50. For example, directly after starting the dialog, the system response is "Hello. How may I help you?." Subsequently, the system response is determined based on the dialog state. For example, rules that are generated beforehand or a model that is trained beforehand is used for the response control.

The system response acquirer 26 acquires the system response (step St81). The analyzer 22 analyzes the system response and the sentence input by the user (steps St82 and St83) and estimates the intention of the user. The intention is estimated for the sentence similarly to the dialog system 110. For the system response, for example, it is determined whether or not a slot parameter corresponding to the content of the tag of the system response is included. For example, the case where the slot parameter corresponding to the content of the tag is included is represented by "1." The case where the slot parameter corresponding to the content of the tag is not included is represented by "0."

The extractor 23 extracts the weight parameter based on the system response and the sentence input by the user (step St84). Steps St85 to St89 respectively are executed similarly to steps St4 to St8 of the flowchart shown in FIG. 4.

According to the dialog system 210, the dialog state can be estimated more appropriately. For example, when the dialog system 210 asks a question to the user and when the dialog system 210 acquires the response to the question, the intention of the user can be estimated more appropriately.

As an example, the dialog system asks the user, "Is Japanese cuisine okay as the cuisine genre?" The user answers "Yeah" in response to the question. In such a case, it is not easy to estimate that the user desires Japanese cuisine only from the sentence of "Yeah" input by the user.

According to the dialog system 210, the system response acquirer 26 acquires the system response. Thereby, when extracting the weight parameter, it is understood that "Yeah" is an affirmation; and the weight of the system response can be increased. As a result, it can be estimated appropriately that the user desires Japanese cuisine.

Figure 17:
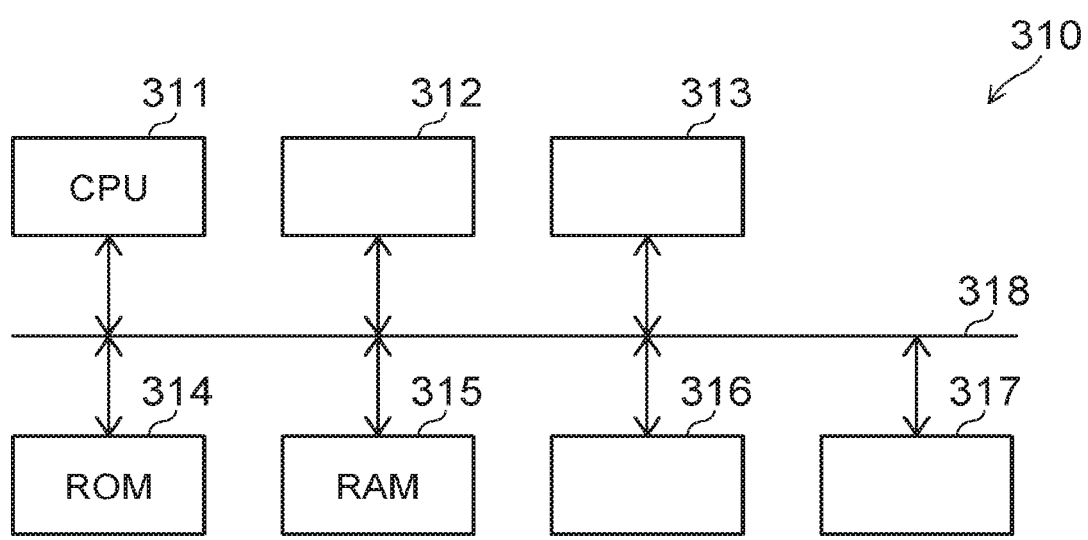
FIG. 17 is a schematic view illustrating the configuration of a dialog device according to the embodiment.

FIG. 17 is a schematic view illustrating the configuration of a dialog device according to the embodiment.

For example, the dialog systems according to the embodiments described above are realized using the dialog device 310 shown in FIG. 15. As an example, the dialog device 310 is realized using a hardware configuration similar to a general computer (information processing device). The dialog device 310 includes a CPU (Central Processing Unit) 311, an acquirer 312, an outputter 313, ROM (Read Only Memory) 314, RAM (Random Access Memory) 315, a memory part 316, a communication device 317, and a bus 318. The components are connected by the bus 318.

The CPU 311 executes various processing in cooperation with various programs pre-stored in the ROM 314 or the memory part 316 and comprehensively controls the operations of the components included in the dialog device 310. In the processing, the CPU 311 uses a prescribed region of the RAM 315 as a work region. The CPU 311 realizes the acquirer 312, the outputter 313, the communication device 317, etc., in cooperation with programs pre-stored in the ROM 314 or the memory part 316.

The acquirer 312 includes, for example, at least one of a keyboard, a microphone, or a touch panel. The acquirer 312 receives the information input from the user as an instruction signal and outputs the instruction signal to the CPU 311. The outputter 313 includes, for example, at least one of a monitor or a speaker. The outputter 313 outputs various information based on the signals output from the CPU 311.

The ROM 314 non-reprogrammably stores programs used to control the dialog device 310, various setting information, etc. The RAM 315 is a volatile storage medium such as SDRAM (Synchronous Dynamic Random Access Memory), etc. The RAM 315 functions as a work region of the CPU 311. Specifically, the RAM 315 functions as a buffer that temporarily stores various variables, parameters, etc., used by the dialog device 310, etc.

The memory part 316 is a reprogrammable recording device such as a storage medium using a semiconductor such as flash memory or the like, a magnetically or optically recordable storage medium, etc. The memory part 316 stores programs used to control the dialog device 310, various setting information, etc. The memory part 316 stores the information stored by the first to seventh memory parts 31 to 37 and the first to third model memory parts 41 to 43. The communication device 317 is used to transmit and receive information by communicating with external devices.

According to the embodiments described above, a dialog system and a dialog state estimation method can be provided in which the history of the dialog state can be processed more appropriately. The history of the dialog state can be processed more appropriately by using a program for executing the embodiments described above in a system and by using a storage medium storing the program.

Hereinabove, embodiments of the invention are described with reference to specific examples. However, the invention is not limited to these specific examples. For example, one skilled in the art may similarly practice the invention by appropriately selecting specific configurations of components such as the acquire, the processor, the memory part, the model memory part, the outputter, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all dialog systems practicable by an appropriate design modification by one skilled in the art based on the dialog systems described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A dialog system, comprising:
   an acquirer acquiring a first sentence, the acquirer including one selected from: a keyboard; a microphone; a touch panel; and
   a processor,
   the processor referring to a first weighting amount based on a first feature and a first weight, the first feature being of a first dialog state and relating to a first slot, the first weight being based on a weight parameter, the weight parameter being output from a model including a neural network by converting the first sentence into a feature vector and by inputting the feature vector as an input into the model including the neural network,
   the processor referring to a second weighting amount based on a first intention amount and a second weight, the first intention amount being of a first intention and relating to the first slot, the first intention being included in the first sentence, the second weight pertaining to the first sentence and being different from the first weight,
   the processor outputting a second feature by using the first weighting amount and the second weighting amount, the second feature being of a second dialog state and relating to the first slot, the second dialog state being after the first dialog state,
   the processor generating a first dialog sentence based on the second dialog state including the second feature,
   the processor outputting the first dialog sentence toward a user.

2. The system according to claim 1, wherein the first weight pertains to a first degree of a mention of the first slot in the first sentence.

3. The system according to claim 2, wherein
   the first weight is larger than the second weight when the first degree is in a first state,
   the second weight is larger than the first weight when the first degree is in a second state, and
   the first degree in the first state is smaller than the first degree in the second state.

4. The system according to claim 1, wherein
   the first slot includes a plurality of first slot parameters, and
   the processor calculates the first intention amount based on similarities between a first vector corresponding to the first sentence and vectors of the plurality of first slot parameters.

5. The system according to claim 1, wherein
   the first weighting amount is based on a product of the first feature and the first weight, and
   the second weighting amount is based on a product of the first intention amount and the second weight.

6. The system according to claim 1, wherein the second feature is based on a sum of the first weighting amount and the second weighting amount.

7. The system according to claim 1, wherein
   the processor further refers to a third weighting amount based on a third feature and a third weight, the third feature being of the first dialog state and relating to a second slot, the third weight pertaining to the first sentence,
   the processor further refers to a fourth weighting amount based on a second intention amount and a fourth weight, the second intention amount being of the first intention and relating to the second slot, the fourth weight pertaining to the first sentence and being different from the third weight, and
   the processor further outputs a fourth feature by using the third weighting amount and the fourth weighting amount, the fourth feature being of the second dialog state and relating to the second slot.

8. The system according to claim 1, wherein
   the acquirer further acquires a second sentence after the acquiring of the first sentence,
   the processor further refers to a fifth weighting amount based on the second feature and a fifth weight, the fifth weight pertaining to the second sentence,
   the processor further refers to a sixth weighting amount based on a second intention amount and a sixth weight, the second intention amount being of a second intention and relating to the first slot, the second intention being included in the second sentence, the sixth weight pertaining to the second sentence and being different from the fifth weight, and the processor further outputs a fifth feature by using the fifth weighting amount and the sixth weighting amount, the fifth feature being of a third dialog state and relating to the first slot, the third dialog state being after the second d clog state.

9. The system according to claim 8, wherein
the processor further refers to a seventh weighting amount based on the first feature and a seventh weight, the seventh weight pertaining to the second sentence and being different from the fifth weight and the sixth weight, and
the processor outputs the fifth feature by using the fifth weighting amount, the sixth weighting amount, and the seventh weighting amount.

10. A dialog system, comprising a processor,
when acquiring a first sentence desiring a first object and a second object, the processor using an Recurrent Neural Network (ANN) to extract a first weight parameter of a first slot parameter and a second weight parameter of a second slot parameter, the first slot parameter corresponding to the first object, the second slot parameter corresponding to the second object;
setting a first priority of the first slot parameter and a second priority of the second slot parameter to be high based on the first weight parameter and the second weight parameter, and
generating a first dialog sentence based on the first priority and the second priority and output the first dialog sentence toward a user,
when acquiring a second sentence negating the second object after the acquiring of the first sentence, the processor
setting the first priority to be higher than the second priority by changing the second weight parameter, and
generating a second dialog sentence based on the first priority and the second priority and output the second dialog sentence toward the user.

11. The system according to claim 10, wherein when acquiring the first sentence, the processor sets the first priority and the second priority to be higher than a third priority of a third slot parameter, the third slot parameter corresponding to a third object.

12. A dialog system, comprising a processor,
when acquiring a first sentence desiring a first object, the processor
using an Recurrent Neural Network (RNN) to extract a first weight parameter of a first slot parameter and a second weight parameter of a second slot parameter, the first slot parameter corresponding to the first object, the second slot parameter corresponding to a second object;
setting a first priority of the first slot parameter to be higher than a second priority of the second slot parameter based on the first weight parameter and the second weight parameter, and
generating a first dialog sentence based on the first priority and the second priority and output the first dialog sentence toward a user,
when acquiring a second sentence desiring the second object after the acquiring of the first sentence, the processor
setting the second priority to be higher than the first priority by changing the second weight parameter, and
generating a second dialog sentence based on the first priority and the second priority and output the second dialog sentence toward the user.

* * * * *